US012762865B2

(12) United States Patent
(10) Patent No.: US 12,762,865 B2
(45) Date of Patent: Oct. 13, 2026

Sakthi et al.

(54) OCCLUSION AND UNCERTAINTY SENSITIVE MODEL TRAINING FOR VEHICLE APPLICATIONS

(71) Applicant: QUALCOMM Incorporated, San Diego, CA (US)

(72) Inventors: Madhumitha Sakthi, San Diego, CA (US); Amin Ansari, Kirkland, WA (US); Diptiben Navinchandra Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 18/745,728

(22) Filed: Jun. 17, 2024

(65) Prior Publication Data

US 2025/0384694 A1 Dec. 18, 2025

(51) Int. Cl.
*G06V 20/56* (2022.01)
*G06V 10/26* (2022.01)
*G06V 10/44* (2022.01)

(52) U.S. Cl.
CPC .............. *G06V 20/56* (2022.01); *G06V 10/26* (2022.01); *G06V 10/44* (2022.01)

(58) Field of Classification Search
CPC ......... G06V 20/56; G06V 10/26; G06V 10/44
USPC .......................................................... 348/148
See application file for complete search history.

(56) References Cited

U.S. PATENT DOCUMENTS 11,893,495 B2 * 2/2024 Kadayam Viswanathan ............... G06F 18/24155
12,271,204 B1 * 4/2025 Garimella ................ G06N 7/01
2022/0126864 A1 * 4/2022 Moustafa .......... B60W 60/0013
2022/0398459 A1 * 12/2022 Hsu ...................... G06N 3/0499
2023/0022265 A1 * 1/2023 Gulino ................. G05D 1/0251
2023/0177839 A1 * 6/2023 Bajpayee .............. G06F 18/213
2024/0104798 A1 * 3/2024 Gubbi Lakshminarasimha .......... G06T 11/006

* cited by examiner

*Primary Examiner* — William C Vaughn, Jr.
*Assistant Examiner* — Asteways Gettu Zewede
(74) *Attorney, Agent, or Firm* — Norton Rose Fulbright US LLP/QUALCOMM Incorporated

(57) ABSTRACT

This disclosure provides systems, methods, and devices for machine learning techniques for improved training, such as for vehicle surroundings analysis. In one aspect, a method is provided that includes receiving image data and position data from the area surrounding a vehicle, determining initial feature data based on the received data, and determining updated feature data for training a first model. The updated feature data may be determined based on uncertainty measures for portions of the initial feature data, occluded regions within the initial feature data, or combinations thereof. In certain aspects, the first model may be trained using knowledge distillation techniques. Other aspects and features are also claimed and described.

28 Claims, 10 Drawing Sheets

OCCLUSION AND UNCERTAINTY SENSITIVE MODEL TRAINING FOR VEHICLE APPLICATIONS

TECHNICAL FIELD

Aspects of the present disclosure relate generally to driver-operated or driver-assisted vehicles, and more particularly, to methods and systems suitable for supplying driving assistance or for autonomous driving.

INTRODUCTION

Vehicles take many shapes and sizes, are propelled by a variety of propulsion techniques, and carry cargo including humans, animals, or objects. These machines have enabled the movement of cargo across long distances, movement of cargo at high speed, and movement of cargo that is larger than could be moved by human exertion. Vehicles originally were driven by humans to control speed and direction of the cargo to arrive at a destination. Human operation of vehicles has led to many unfortunate incidents resulting from the collision of vehicle with vehicle, vehicle with object, vehicle with human, or vehicle with animal. As research into vehicle automation has progressed, a variety of driving assistance systems have been produced and introduced. These include navigation directions by GPS, adaptive cruise control, lane change assistance, collision avoidance systems, night vision, parking assistance, and blind spot detection.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

Human operators of vehicles can be distracted, which is one factor in many vehicle crashes. Driver distractions can include changing the radio, observing an event outside the vehicle, and using an electronic device, etc. Sometimes circumstances create situations that even attentive drivers are unable to identify in time to prevent vehicular collisions. Aspects of this disclosure provide improved systems for assisting drivers in vehicles with enhanced situational awareness when driving on a road.

One aspect provides a method comprising receiving image data and position data captured from an area surrounding a vehicle; determining, based on the image data and the position data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

Another aspect provides a method comprising receiving image data and position data captured from an area surrounding a vehicle; determining, based on the image data and the position data, initial feature data for the area surrounding the vehicle; determining occluded regions within the image data; determining updated feature data for objects corresponding to the occluded regions; and training a first model based on the updated feature data.

A further aspect provides an apparatus, comprising an image sensor configured to capture image data for an area surrounding a vehicle; a position sensor configured to capture position data for the area surrounding the vehicle; a memory storing processor-readable code; and at least one processor coupled to the memory, the image sensor, and the position sensor, the at least one processor configured to execute the processor-readable code to cause the at least one processor to perform operations including receiving image data and position data captured from an area surrounding the vehicle; determining, based on the image data and the position data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

An additional aspect provides an apparatus, comprising an image sensor configured to capture image data for an area surrounding a vehicle; a position sensor configured to capture position data for the area surrounding the vehicle; a memory storing processor-readable code; and at least one processor coupled to the memory, the image sensor, and the position sensor, the at least one processor configured to execute the processor-readable code to cause the at least one processor to perform operations including receiving image data and position data captured from an area surrounding the vehicle; determining, based on the image data and the position data, initial feature data for the area surrounding the vehicle; determining occluded regions within the image data; determining updated feature data for objects corresponding to the occluded regions; and training a first model based on the updated feature data.

Another aspect includes a non-transitory computer-readable medium storing instructions that, when executed by a processor, cause the processor to perform operations comprising receiving image data and position data captured from an area surrounding a vehicle; determining, based on the image data and the position data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

A further aspect includes a non-transitory computer-readable medium storing instructions that, when executed by a processor, cause the processor to perform operations comprising receiving image data and position data captured from an area surrounding a vehicle; determining, based on the image data and the position data, initial feature data for the area surrounding the vehicle; determining occluded regions within the image data; determining updated feature data for objects corresponding to the occluded regions; and training a first model based on the updated feature data.

An additional aspect provides a method comprising receiving first data and second data captured from an area surrounding a vehicle; determining, based on the first data and the second data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

Another aspect provides a method comprising receiving first data and second data captured from an area surrounding a vehicle; determining, based on the first data and the second data, initial feature data for the area surrounding the vehicle; determining occluded regions within the first data; determining updated feature data for objects corresponding to the occluded regions; and training a first model based on the updated feature data.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) ng networks, LTE networks, GSM networks, $5^{th}$ Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). 5G networks include diverse deployments, diverse spectrum, and diverse services and devices that may be implemented using an OFDM-based unified, air interface.

The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mm Wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mm Wave components at a TDD of 28 GHz, subcarrier spacing may occur with 120 kHz over a 500 MHz bandwidth.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur.

Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination.

Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

Also, as used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

Also, as used herein, relative terms, unless otherwise specified, may be understood to be relative to a reference by a certain amount. For example, terms such as "higher" or "lower" or "more" or "less" may be understood as higher, lower, more, or less than a reference value by a threshold amount.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
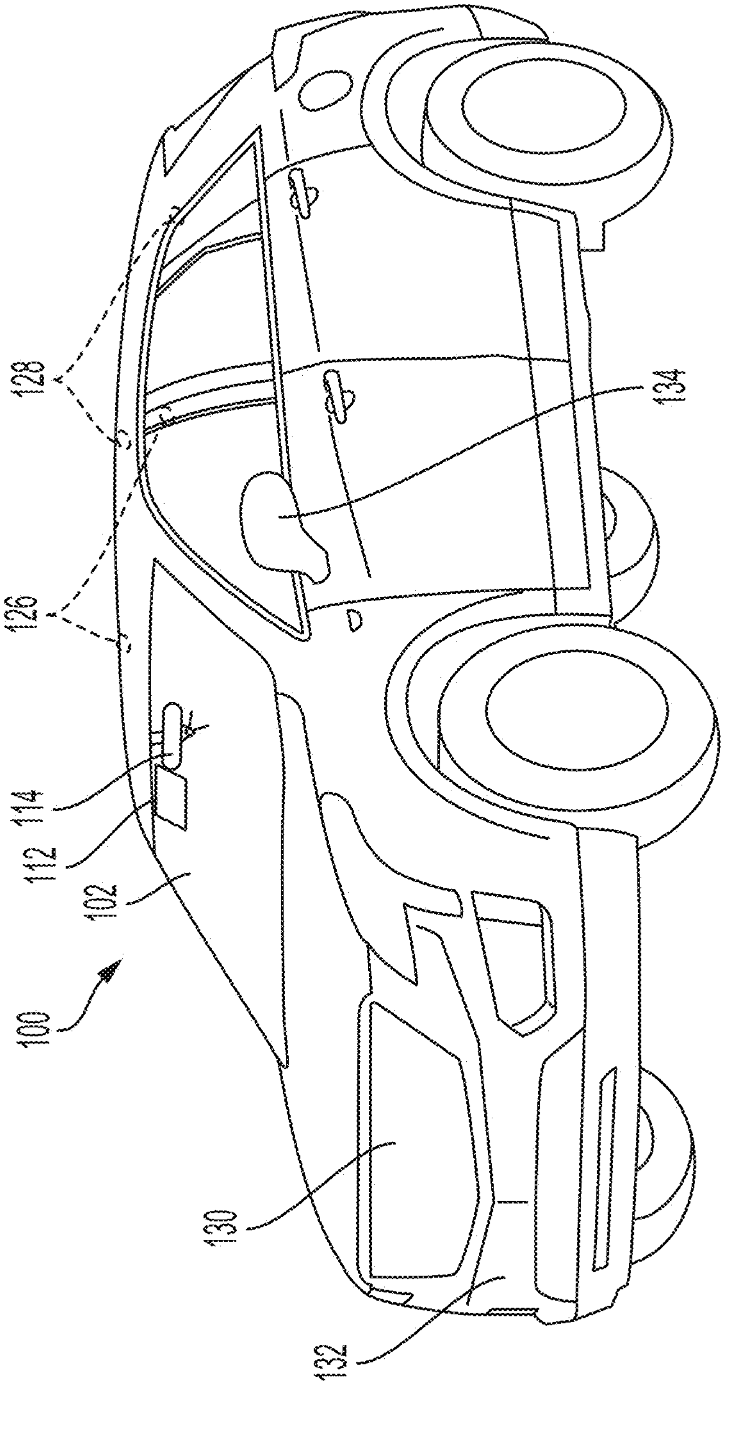
FIG. 1 is a perspective view of a motor vehicle with a driver monitoring system according to embodiments of this disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support improved knowledge distillation in neural networks by accounting for occlusions and uncertainties within a teacher model.

Existing knowledge distillation techniques may typically focus on transferring knowledge from a teacher network to a student network, such as either at the feature level or response level by directly using ground truth (GT). However, such techniques may not adequately address occlusions created by sensor placements or uncertainties in the teacher network's predictions. In autonomous vehicle systems, sensors such as cameras and LiDARs are placed at different positions on the vehicle, potentially causing significant occlusion and feature alignment discrepancies due to varied perspectives, making knowledge distillation difficult and impractical.

For instance, a LiDAR sensor mounted on top of a vehicle might capture data from regions behind the ego-vehicle that are not visible to lower-mounted cameras. This mismatch may lead to discrepancies in the fused multi-modal data, challenging the consistency and accuracy of the knowledge distillation process. Moreover, reliance on camera-only models, which lack 3D information, can introduce artifacts and incorrect depth values behind occluded objects. Additionally, uncertainty in the teacher network's predictions can propagate to the student network, exacerbating performance issues in unfamiliar or safety-critical scenarios.

One solution to this problem is to perform knowledge distillation based on measures of occlusion, uncertainty, or both. Occlusion-aware distillation may identify regions in received data that are occluded, and may adjust features from a teacher network based on ground truth data from another sensor. Uncertainty-aware distillation may leverage uncertainty measures for feature predictions by the teacher network to guide the distillation process. These measures may help filter out regions where the teacher network is less confident in favor of features from ground truth data.

Particular implementations of the subject matter described in this disclosure may be implemented to realize one or more of the following potential advantages or benefits. In some aspects, the present disclosure provides techniques for occlusion and uncertainty-aware knowledge distillation that may be particularly beneficial in autonomous driving systems. For example, by addressing occlusion and feature alignment discrepancies, the described techniques enhance the accuracy and reliability of multi-modal sensor data fusion and the ability to use knowledge distillation for vehicle applications. This is crucial in ensuring the autonomous system can make informed decisions based on consistent and accurate sensory inputs.

Similarly, the use of uncertainty measures to inform distillation helps mitigate the propagation of uncertain predictions from the teacher network to the student network. This can improve the safety and robustness of the system, especially in unfamiliar environments. Furthermore, these techniques may reduce the need for extensive sensor calibration and support the development of more efficient camera-only models that still achieve high performance akin to multi-modal systems. Additionally, the use of knowledge distillation techniques may reduce overall model size for deployed models, reducing the computing resources required to perform inferences using the models. Ultimately, end users may experience safer and more reliable autonomous driving features due to these advanced knowledge distillation methods.

FIG. 1 is a perspective view of a motor vehicle with a driver monitoring system according to embodiments of this disclosure. A vehicle 100 may include a front-facing camera 112 mounted inside the cabin looking through the windshield 102. The vehicle may also include a cabin-facing camera 114 mounted inside the cabin looking towards occupants of the vehicle 100, and in particular the driver of the vehicle 100. Although one set of mounting positions for cameras 112 and 114 are shown for vehicle 100, other mounting locations may be used for the cameras 112 and 114. For example, one or more cameras may be mounted on one of the driver or passenger B pillars 126 or one of the driver or passenger C pillars 128, such as near the top of the pillars 126 or 128. As another example, one or more cameras may be mounted at the front of vehicle 100, such as behind the radiator grill 130 or integrated with bumper 132. As a further example, one or more cameras may be mounted as part of a driver or passenger side mirror assembly 134.

The camera 112 may be oriented such that the field of view of camera 112 captures a scene in front of the vehicle 100 in the direction that the vehicle 100 is moving when in drive mode or forward direction. In some embodiments, an additional camera may be located at the rear of the vehicle 100 and oriented such that the field of view of the additional camera captures a scene behind the vehicle 100 in the direction that the vehicle 100 is moving when in reverse direction. Although embodiments of the disclosure may be described with reference to a “front-facing” camera, referring to camera 112, aspects of the disclosure may be applied similarly to a “rear-facing” camera facing in the reverse direction of the vehicle 100. Thus, the benefits obtained while the operator is driving the vehicle 100 in a forward direction may likewise be obtained while the operator is driving the vehicle 100 in a reverse direction.

Further, although embodiments of the disclosure may be described with reference a “front-facing” camera, referring to camera 112, aspects of the disclosure may be applied similarly to an input received from an array of cameras mounted around the vehicle 100 to provide a larger field of view, which may be as large as 360 degrees around parallel to the ground and/or as large as 360 degrees around a vertical direction perpendicular to the ground. For example, additional cameras may be mounted around the outside of vehicle 100, such as on or integrated in the doors, on or integrated in the wheels, on or integrated in the bumpers, on or integrated in the hood, and/or on or integrated in the roof.

The camera 114 may be oriented such that the field of view of camera 114 captures a scene in the cabin of the vehicle and includes the user operator of the vehicle, and in particular the face of the user operator of the vehicle with sufficient detail to discern a gaze direction of the user operator.

Each of the cameras 112 and 114 may include one, two, or more image sensors, such as including a first image sensor. When multiple image sensors are present, the first image sensor may have a larger field of view (FOV) than the second image sensor or the first image sensor may have different sensitivity or different dynamic range than the second image sensor. In one example, the first image sensor may be a wide-angle image sensor, and the second image sensor may be a telephoto image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. This configuration may occur in a camera module with a lens cluster, in which the multiple image sensors and associated lenses are located in offset locations within the camera module. Additional image sensors may be included with larger, smaller, or same fields of view.

Each image sensor may include means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors), and/or time of flight detectors. The apparatus may further include one or more means for accumulating and/or focusing light rays into the one or more image sensors (including simple lenses, compound lenses, spherical lenses, and non-spherical lenses). These components may be controlled to capture the first, second, and/or more image frames. The image frames may be processed to form a single output image frame, such as through a fusion operation, and that output image frame further processed according to the aspects described herein.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

Figure 2:
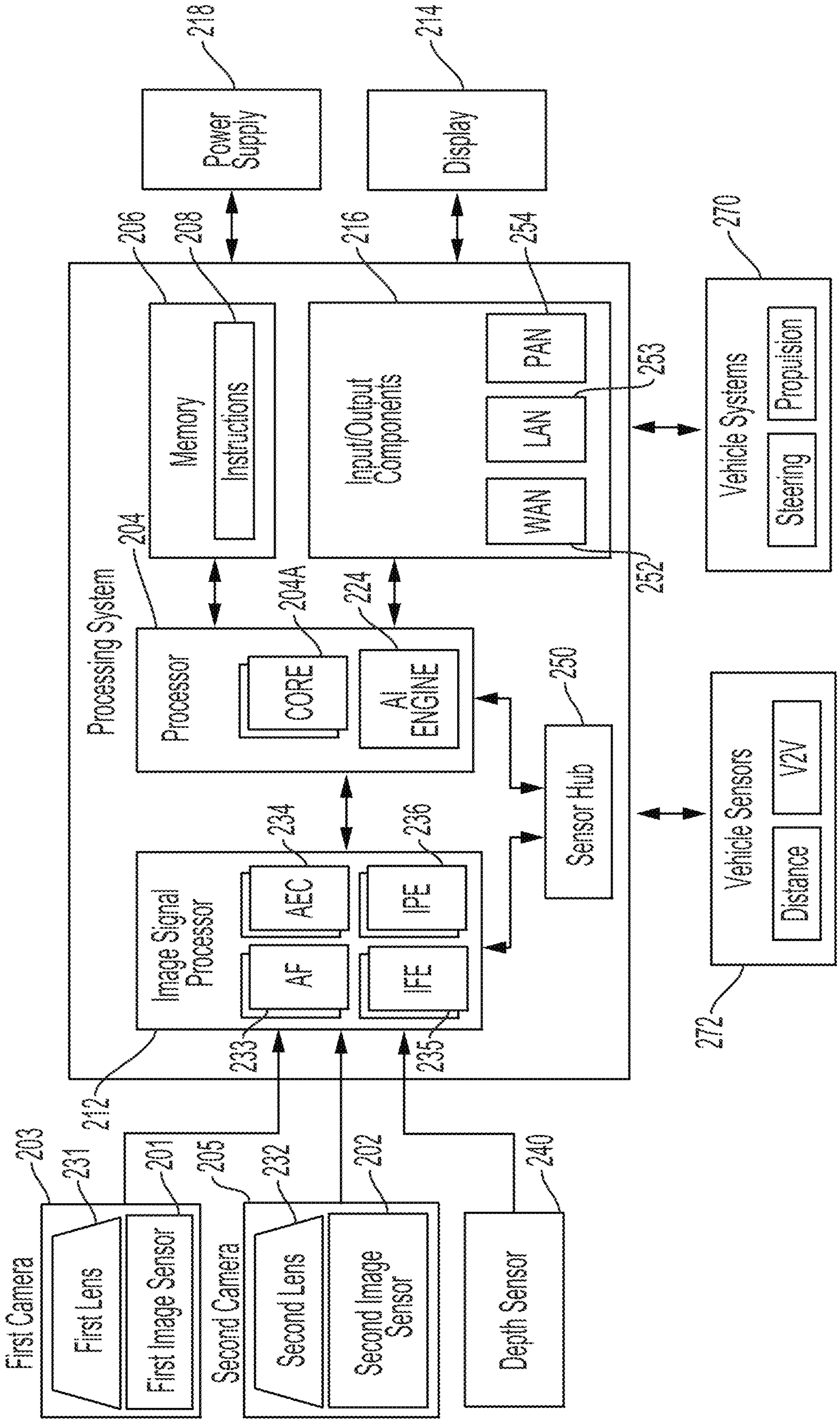
FIG. 2 shows a block diagram of an example image processing configuration for a vehicle according to one or more aspects of the disclosure.

FIG. 2 shows a block diagram of an example image processing configuration for a vehicle according to one or more aspects of the disclosure. The vehicle 100 may include, or otherwise be coupled to, an image signal processor 212 for processing image frames from one or more image sensors, such as a first image sensor 201, a second image sensor 202, and a depth sensor 240. In some implementations, the vehicle 100 also includes or is coupled to a processor (e.g., CPU) 204 and a memory 206 storing instructions 208. The device 100 may also include or be coupled to a display 214 and input/output (I/O) components 216. I/O components 216 may be used for interacting with a user, such as a touch screen interface and/or physical buttons. I/O components 216 may also include network interfaces for communicating with other devices, such as other vehicles, an operator's mobile devices, and/or a remote monitoring system. The network interfaces may include one or more of a wide area network (WAN) adaptor 252, a local area network (LAN) adaptor 253, and/or a personal area network (PAN) adaptor 254. An example WAN adaptor 252 is a 4G LTE or a 5G NR wireless network adaptor. An example LAN adaptor 253 is an IEEE 802.11 WiFi wireless network adapter. An example PAN adaptor 254 is a Bluetooth wireless network adaptor. Each of the adaptors 252, 253, and/or 254 may be coupled to an antenna, including multiple antennas configured for primary and diversity reception and/or configured for receiving specific frequency bands. The vehicle 100 may further include or be coupled to a power supply 218, such as a battery or an alternator. The vehicle 100 may also include or be coupled to additional features or components that are not shown in FIG. 2. In one example, a wireless interface, which may include one or more transceivers and associated baseband processors, may be coupled to or included in WAN adaptor 252 for a wireless communication device. In a further example, an analog front end (AFE) to convert analog image frame data to digital image frame data may be coupled between the image sensors 201 and 202 and the image signal processor 212.

The vehicle 100 may include a sensor hub 250 for interfacing with sensors to receive data regarding movement of the vehicle 100, data regarding an environment around the vehicle 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and or distance may be included in generated motion data. In further examples, a non-camera sensor may be a global positioning system (GPS) receiver, a light detection and ranging (LiDAR) system, a radio detection and ranging (RADAR) system, or other ranging systems. For example, the sensor hub 250 may interface to a vehicle bus for sending configuration commands and/or receiving information from vehicle sensors 272, such as distance (e.g., ranging) sensors or vehicle-to-vehicle (V2V) sensors (e.g., sensors for receiving information from nearby vehicles).

The image signal processor (ISP) 212 may receive image data, such as used to form image frames. In one embodiment, a local bus connection couples the image signal processor 212 to image sensors 201 and 202 of a first camera 203, which may correspond to camera 112 of FIG. 1, and second camera 205, which may correspond to camera 114 of FIG. 1, respectively. In another embodiment, a wire interface may couple the image signal processor 212 to an external image sensor. In a further embodiment, a wireless interface may couple the image signal processor 212 to the image sensor 201, 202.

The first camera 203 may include the first image sensor 201 and a corresponding first lens 231. The second camera 205 may include the second image sensor 202 and a corresponding second lens 232. Each of the lenses 231 and 232 may be controlled by an associated autofocus (AF) algorithm 233 executing in the ISP 212, which adjust the lenses 231 and 232 to focus on a particular focal plane at a certain scene depth from the image sensors 201 and 202. The AF algorithm 233 may be assisted by depth sensor 240. In some embodiments, the lenses 231 and 232 may have a fixed focus.

The first image sensor 201 and the second image sensor 202 are configured to capture one or more image frames. Lenses 231 and 232 focus light at the image sensors 201 and 202, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging.

In some embodiments, the image signal processor 212 may execute instructions from a memory, such as instructions 208 from the memory 206, instructions stored in a separate memory coupled to or included in the image signal processor 212, or instructions provided by the processor 204. In addition, or in the alternative, the image signal processor 212 may include specific hardware (such as one or more integrated circuits (ICs)) configured to perform one or more operations described in the present disclosure. For example, the image signal processor 212 may include one or more image front ends (IFEs) 235, one or more image post-processing engines (IPEs) 236, and or one or more auto exposure compensation (AEC) 234 engines. The AF 233, AEC 234, IFE 235, IPE 236 may each include application-specific circuitry, be embodied as software code executed by the ISP 212, and/or a combination of hardware within and software code executing on the ISP 212.

In some implementations, the memory 206 may include a non-transient or non-transitory computer readable medium storing computer-executable instructions 208 to perform all or a portion of one or more operations described in this disclosure. In some implementations, the instructions 208 include a camera application (or other suitable application) to be executed during operation of the vehicle 100 for generating images or videos. The instructions 208 may also include other applications or programs executed for the vehicle 100, such as an operating system, mapping applications, or entertainment applications. Execution of the camera application, such as by the processor 204, may cause the vehicle 100 to generate images using the image sensors 201 and 202 and the image signal processor 212. The memory 206 may also be accessed by the image signal processor 212 to store processed frames or may be accessed by the processor 204 to obtain the processed frames. In some embodiments, the vehicle 100 includes a system on chip (SoC) that incorporates the image signal processor 212, the processor 204, the sensor hub 250, the memory 206, and input/output components 216 into a single package.

In some embodiments, at least one of the image signal processor 212 or the processor 204 executes instructions to perform various operations described herein, including object detection, risk map generation, driver monitoring, and driver alert operations. For example, execution of the instructions can instruct the image signal processor 212 to begin or end capturing an image frame or a sequence of image frames. In some embodiments, the processor 204 may include one or more general-purpose processor cores 204A capable of executing scripts or instructions of one or more software programs, such as instructions 208 stored within the memory 206. For example, the processor 204 may include one or more application processors configured to execute the camera application (or other suitable application for generating images or video) stored in the memory 206.

In executing the camera application, the processor 204 may be configured to instruct the image signal processor 212 to perform one or more operations with reference to the image sensors 201 or 202. For example, the camera application may receive a command to begin a video preview display upon which a video comprising a sequence of image frames is captured and processed from one or more image sensors 201 or 202 and displayed on an informational display on display 114 in the cabin of the vehicle 100.

In some embodiments, the processor 204 may include ICs or other hardware (e.g., an artificial intelligence (AI) engine 224) in addition to the ability to execute software to cause the vehicle 100 to perform a number of functions or operations, such as the operations described herein. In some other embodiments, the vehicle 100 does not include the processor 204, such as when all of the described functionality is configured in the image signal processor 212.

In some embodiments, the display 214 may include one or more suitable displays or screens allowing for user interaction and/or to present items to the user, such as a preview of the image frames being captured by the image sensors 201 and 202. In some embodiments, the display 214 is a touch-sensitive display. The I/O components 216 may be or include any suitable mechanism, interface, or device to receive input (such as commands) from the user and to provide output to the user through the display 214. For example, the I/O components 216 may include (but are not limited to) a graphical user interface (GUI), a keyboard, a mouse, a microphone, speakers, a squeezable bezel, one or more buttons (such as a power button), a slider, a switch, and so on. In some embodiments involving autonomous driving, the I/O components 216 may include an interface to a vehicle's bus for providing commands and information to and receiving information from vehicle systems 270 including propulsion (e.g., commands to increase or decrease speed or apply brakes) and steering systems (e.g., commands to turn wheels, change a route, or change a final destination).

While shown to be coupled to each other via the processor 204, components (such as the processor 204, the memory 206, the image signal processor 212, the display 214, and the I/O components 216) may be coupled to each another in other various arrangements, such as via one or more local buses, which are not shown for simplicity. While the image signal processor 212 is illustrated as separate from the processor 204, the image signal processor 212 may be a core of a processor 204 that is an application processor unit (APU), included in a system on chip (SoC), or otherwise included with the processor 204. While the vehicle 100 is referred to in the examples herein for including aspects of the present disclosure, some device components may not be shown in FIG. 2 to prevent obscuring aspects of the present disclosure. Additionally, other components, numbers of components, or combinations of components may be included in a suitable vehicle for performing aspects of the present disclosure. As such, the present disclosure is not limited to a specific device or configuration of components, including the vehicle 100.

Figure 3:
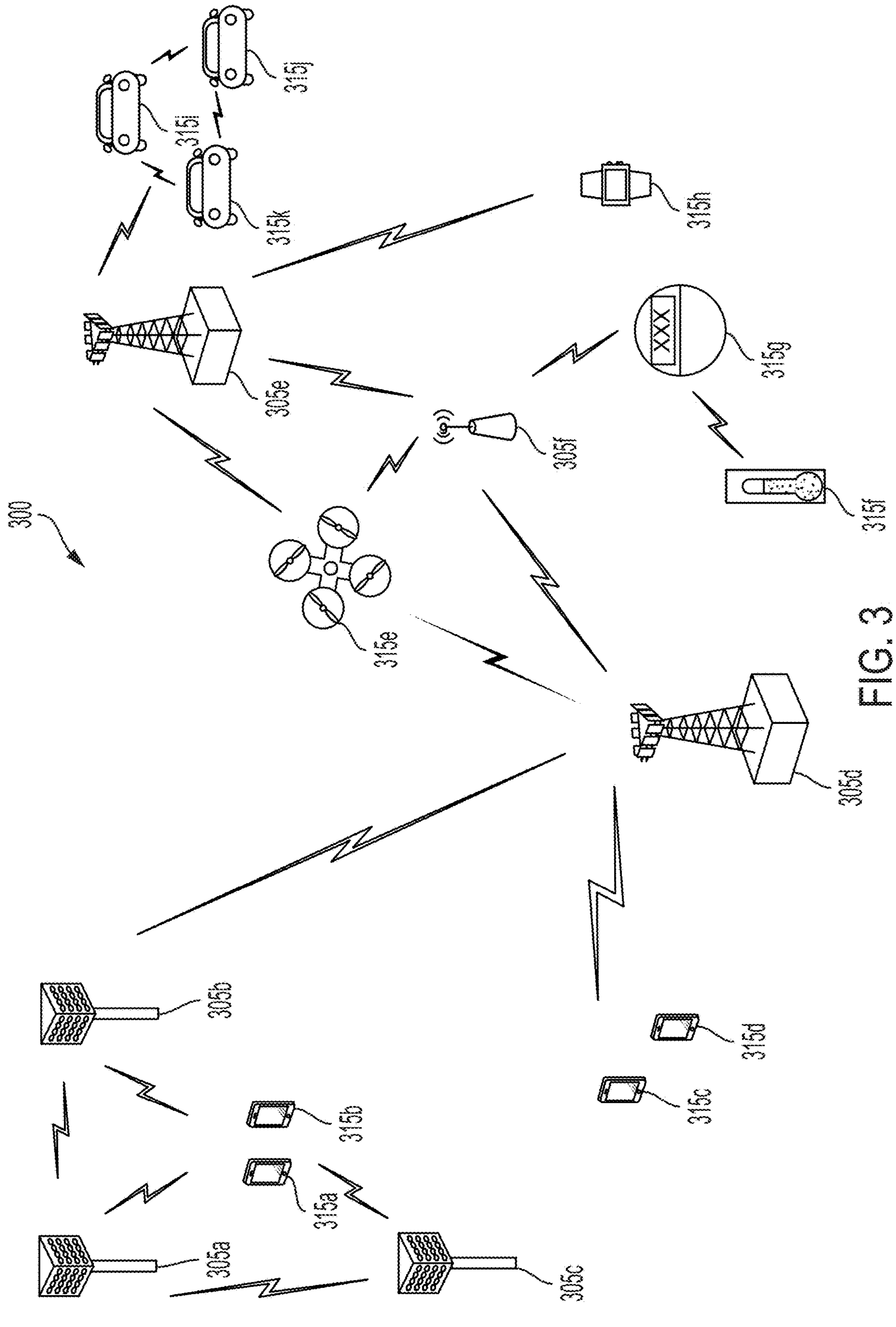
FIG. 3 is a block diagram illustrating details of an example wireless communication system according to one or more aspects.

The vehicle 100 may communicate as a user equipment (UE) within a wireless network 300, such as through WAN adaptor 252, as shown in FIG. 3. FIG. 3 is a block diagram illustrating details of an example wireless communication system according to one or more aspects. Wireless network 300 may, for example, include a 5G wireless network. As appreciated by those skilled in the art, components appearing in FIG. 3 are likely to have related counterparts in other network arrangements including, for example, cellular-style network arrangements and non-cellular-style-network arrangements (e.g., device-to-device or peer-to-peer or ad-hoc network arrangements, etc.).

Wireless network 300 illustrated in FIG. 3 includes base stations 305 and other network entities. A base station may be a station that communicates with the UEs and may also be referred to as an evolved node B (eNB), a next generation eNB (gNB), an access point, and the like. Each base station 305 may provide communication coverage for a particular geographic area. In 3GPP, the term "cell" may refer to this particular geographic coverage area of a base station or a base station subsystem serving the coverage area, depending on the context in which the term is used. In implementations of wireless network 300 herein, base stations 305 may be associated with a same operator or different operators (e.g., wireless network 300 may include a plurality of operator wireless networks). Additionally, in implementations of wireless network 300 herein, base station 305 may provide wireless communications using one or more of the same frequencies (e.g., one or more frequency bands in licensed spectrum, unlicensed spectrum, or a combination thereof) as a neighboring cell. In some examples, an individual base station 305 or UE 315 may be operated by more than one network operating entity. In some other examples, each base station 305 and UE 315 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 3, base stations 305*d* and 305*e* are regular macro base stations, while base stations 305*a*-305*c* are macro base stations enabled with one of three-dimension (3D), full dimension (FD), or massive MIMO. Base stations 305*a*-305*c* take advantage of their higher dimension MIMO capabilities to exploit 3D beamforming in both elevation and azimuth beamforming to increase coverage and capacity. Base station 305*f* is a small cell base station which may be a home node or portable access point. A base station may support one or multiple (e.g., two, three, four, and the like) cells.

Wireless network 300 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 315 are dispersed throughout the wireless network 300, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology.

Some non-limiting examples of a mobile apparatus, such as may include implementations of one or more of UEs 315, include a mobile, a cellular (cell) phone, a smart phone, a session initiation protocol (SIP) phone, a wireless local loop (WLL) station, a laptop, a personal computer (PC), a notebook, a netbook, a smart book, a tablet, a personal digital assistant (PDA), and a vehicle. Although UEs 315*a-j* are specifically shown as vehicles, a vehicle may employ the communication configuration described with reference to any of the UEs 315*a*-315*k*.

In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 315*a*-315*d* of the implementation illustrated in FIG. 3 are examples of mobile smart phone-type devices accessing wireless network 300. A UE may also be a machine specifically configured for connected communication, including machine type communication (MTC), enhanced MTC (eMTC), narrowband IoT (NB-IoT) and the like. UEs 315*e*-315*k* illustrated in FIG. 3 are examples of various machines configured for communication that access wireless network 300.

A mobile apparatus, such as UEs 315, may be able to communicate with any type of the base stations, whether macro base stations, pico base stations, femto base stations, relays, and the like. In FIG. 3, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 300 may occur using wired or wireless communication links.

In operation at wireless network 300, base stations 305*a*-305*c* serve UEs 315*a* and 315*b* using 3D beamforming and coordinated spatial techniques, such as coordinated multipoint (CoMP) or multi-connectivity. Macro base station 305*d* performs backhaul communications with base stations 305*a*-305*c*, as well as small cell, base station 305*f*. Macro base station 305*d* also transmits multicast services which are subscribed to and received by UEs 315*c* and 315*d*. Such multicast services may include mobile television or stream video, or may include other services for providing community information, such as weather emergencies or alerts, such as Amber alerts or gray alerts.

Wireless network 300 of implementations supports mission critical communications with ultra-reliable and redundant links for mission critical devices, such UE 315*e*, which is a drone. Redundant communication links with UE 315*e* include from macro base stations 305*d* and 305*e*, as well as small cell base station 305*f*. Other machine type devices, such as UE 315*f* (thermometer), UE 315*g* (smart meter), and UE 315*h* (wearable device) may communicate through wireless network 300 either directly with base stations, such as small cell base station 305*f*, and macro base station 305*e*, or in multi-hop configurations by communicating with another user device which relays its information to the network, such as UE 315*f* communicating temperature measurement information to the smart meter, UE 315*g*, which is then reported to the network through small cell base station 305*f*. Wireless network 300 may also provide additional network efficiency through dynamic, low-latency TDD communications or low-latency FDD communications, such as in a vehicle-to-vehicle (V2V) mesh network between UEs 315*i*-315*k* communicating with macro base station 305*e*.

Aspects of the vehicular systems described with reference to, and shown in, FIG. 1, FIG. 2, and FIG. 3 may include training one or more machine learning models using knowledge distillation techniques.

Figure 4A:
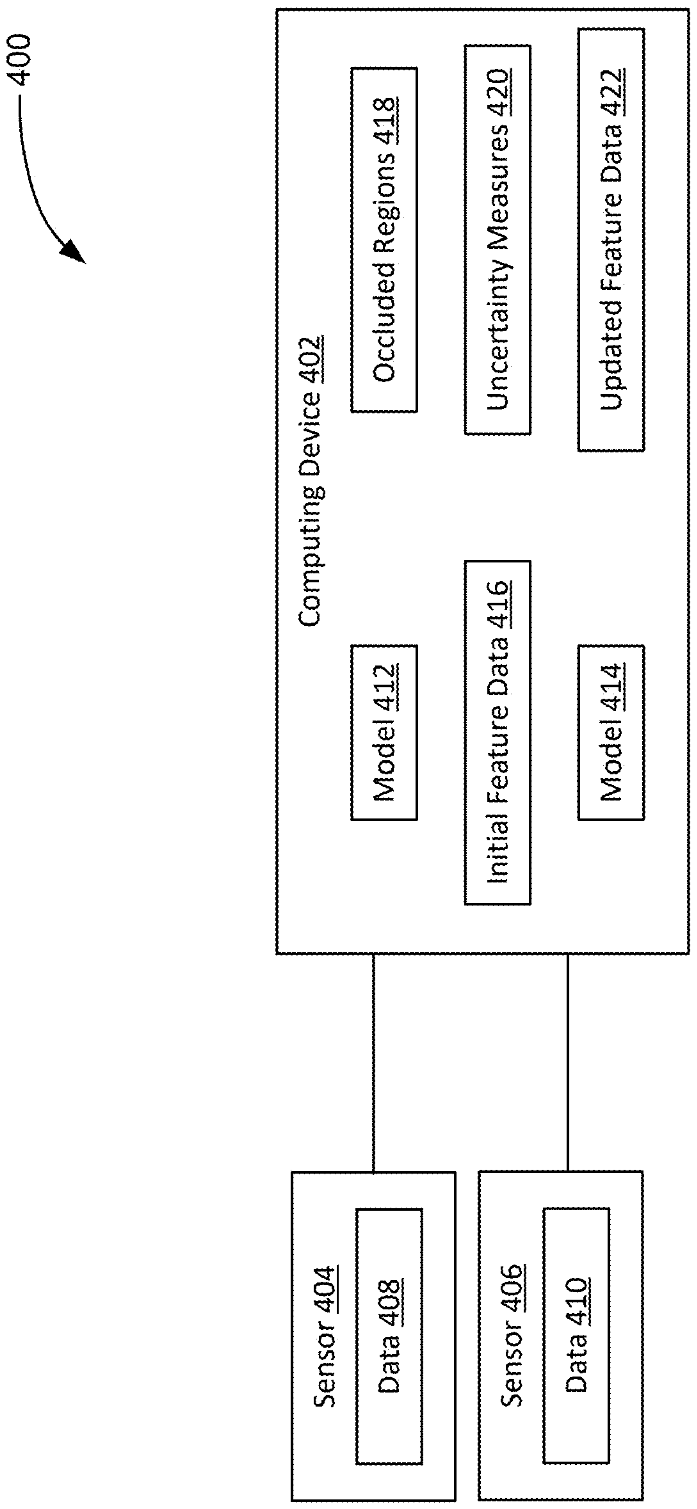
FIG. 4A is a block diagram illustrating a system for training machine learning models according to one or more aspects of the disclosure.

FIG. 4A is a block diagram illustrating a system 400 for model training according to one aspect of the present disclosure. The system 400 includes a first sensor 404, a second sensor 406, and a computing device 402. The first sensor 404 includes first data 408 and the second sensor 406 includes second data 410. The computing device 402 includes occluded regions 418, uncertainty measures 420, a first model 412, a second model 414, initial feature data 416, and updated feature data 422. The system 400 may be an exemplary implementation of one or more above-discussed aspects. For example, the system 400 may be contained within the vehicle 100, may be an exemplary implementation of the processing system in FIG. 2 (such as the ISP 212, the processor 204, or combinations thereof), and the like. In various additional or alternative implementations, the computing device 402 may be an embedded computer system, a system-on-chip (SOC), a desktop computer system, a laptop or notebook computer system, a mainframe, a mesh of computer systems, a mobile telephone, a server, a tablet computer system, or a combination of two or more of these. Where appropriate, the computing device 402 may include one or more computing devices; be unitary or distributed; span multiple locations; span multiple machines; span multiple data centers; or reside in a cloud, which may include one or more cloud components in one or more networks.

The computing device 402 may be configured to receive first data 408 and second data 410 captured from an area surrounding the vehicle. In certain implementations, the data 408, 410 may include image data captured by cameras, position data from position sensors, and the like. In particular implementations, the first data 408 may be image data and the second data 410 may be position data. For example, the first sensor 404 may be an image sensor and the second sensor may be a position sensor (such as a LiDAR sensor). In additional or alternative implementations, the first data 408 and the second data 410 may both be position data. For example, the first data 408 may be radar data and the second data 410 may be LiDAR data.

In certain implementations, image data may include one or more image frames captured from an area around a vehicle. For example, the vehicle may be equipped with one or more cameras. These cameras may be configured to capture images on a regular basis. In certain implementations, the image frames may include a single image that has been captured by a single camera. In other implementations, the image frames may include multiple image frames that have been captured by a single camera, such as a stream of image frames captured by the camera. In additional or alternative implementations, the image frames may include multiple image frames that have been captured by multiple cameras, such as multiple cameras facing different portions of an area surrounding the vehicle.

In certain implementations, position data may include point cloud position information for various points along an exterior surface of objects within the area surrounding the vehicle. In some implementations, the position data may be raw position points measured by a positional sensor (such as a LiDAR sensor, an ultrasonic position sensor, a radar sensor and the like). In additional or alternative implementations, the position data may have been previously processed to extract only the position points that correspond to particular objects. Additionally or alternatively, the position data points may be tagged with identifiers of corresponding objects. In various implementations, the position data may include positioning information from GPS, radar data that provides detailed distance measurements, LiDAR data that provides detailed distance measurements, inertial measurements from IMUs (Inertial Measurement Units), and the like.

The computing device 402 may be configured to determine, based on the first data 408 and the second data 410, initial feature data 416 for the area surrounding the vehicle.

For example, the initial feature data 416 may be determined by the second model 414. In certain implementations, the initial feature data 416 may include perspective view feature data, top view feature data, or a combination thereof. Perspective view feature data may include features within the data 408, 410, wherein the location is determined relative to the view or perspective of the sensor 404, 406 that captured the data 408, 410. Top view feature data may include features whose locations have been projected into a top view representation of an area surrounding the vehicle. A top view representation, in the context of vehicle applications such as autonomous vehicle navigation and perception systems, may be understood as a two-dimensional depiction of the environment surrounding a vehicle, as it would be perceived from a hypothetical vantage point directly above the vehicle (such as a bird's eye view (BEV)). Such representations may be generated to provide a comprehensive overview of the vehicle's immediate surroundings, which may prove invaluable in safe navigation and driving strategy formulation. To generate the top view representation, the perspective view features may be projected onto locations within the top view representation. This may include transforming spatial information for the perspective view features into the top-down perspective of the top view.

In certain implementations, the initial feature data 416 may include one or more feature vectors. Feature vectors for images may include one or more numerical representations of various aspects of received data 408, 410. In certain implementations, feature vectors may be single-dimensional, such as an N×1 vector, where N is the number of features. In additional or alternative implementations, feature vectors may be multi-dimensional, such as an N×M×O vector, where at least two of N, M, and O are greater than 1.

For image data, examples of features included within a corresponding feature vector may include numerical representations of color histograms, texture descriptors, edge detection, and shape analysis. Color histograms may quantify the distribution of colors in an image, while texture descriptors may capture patterns such as roughness or smoothness. Edge detections may identify boundaries between objects in an image, while shape analysis may identify or otherwise distinguish different types of objects based on geometric properties of the object within the image. For images, For position data, examples of features included within a corresponding feature vector may include numerical representations of various aspects of a point cloud. Some examples of features include distance histograms, surface normals, curvature estimation, and segmentation. Distance histograms may quantify the distribution of distances between points in a point cloud, while surface normals may capture the orientation of local surfaces. Curvature estimation may measure the degree of bending or flatness of a surface, while segmentation may identify or otherwise distinguish different types of objects based on spatial proximity and similarity of the points within the point cloud.

In certain implementations, the feature vectors may have corresponding locations, such as corresponding perspective view locations for relative to the sensors 404, 406, corresponding locations within the top view representation of the area surrounding the vehicle, or a combination thereof. For example, the feature vectors may initially be determined as perspective view features based on the data 408, 410. Locations for the feature vectors may then be projected onto a top view representation, with each feature vector yielding a corresponding projection within the environment's top-down view.

The computing device 402 may be configured to train the first model 412 based on the second model 414. In particular, the computing device 402 may be configured to train the first model 412 based on the initial feature data 416 determined by the second model 414 according to knowledge distillation techniques. Knowledge distillation, which may also be known as feature distillation, includes techniques for training one machine learning model based on another machine learning model. In particular, knowledge distillation may be performed to transfer learned knowledge or learned behavior from one machine learning model to another machine learning model. For example, knowledge distillation may be performed to train a first machine learning model (which may be referred to as a student model) based on a separate, second machine learning model (which may be referred to as a teacher model). In certain implementations, knowledge distillation may enable the first model to be trained to perform similar functions to the second model into exhibit similar behavior to the second model while also being smaller in size than the second model. Such implementations may reduce the computing resources required to run the first machine learning model (such as during inference).

In practice, knowledge distillation may include training student network not just with the standard supervised learning targets (such as specific labels in classification tasks), but also with additional information extracted from the teacher network. Such additional information may include softened output distributions, which may carry more information per training example than conventional hard labels. For example, softened output distributions may include probabilities for corresponding features instead of a single, target label.

In certain implementations, knowledge distillation may be performed by first training the teacher model on a given data sets to learn a specific task or behavior. The teacher model may typically be larger and may include an ensemble model formed from multiple other models. A training dataset (such as of soft targets) may then be determined for the student model based on received training data (such as received sensor data was not used to initially train the teacher model). The student model may then be trained based on the training dataset and may be trained to mimic or otherwise re-create expected outputs from the training data set (such as the soft outputs) based on the same sensor data. In certain implementations, the student model may be trained by minimizing a loss function (such as a loss function that combines hard target (such as cross entropy) losses with soft target losses (such as using a temperature parameter in a soft max function).

In this way, the student model may be trained in such a way that the student model is able to perform similar functions to the teacher model while minimizing the size and therefore the computing resources required to utilize the student network for inference operations. Furthermore, knowledge distillation may improve model generalization because the use of soft targets may reduce over fitting to the training data and enable a more generalized transfer of the desired behavior from the teacher network to the student network.

Figure 4B:
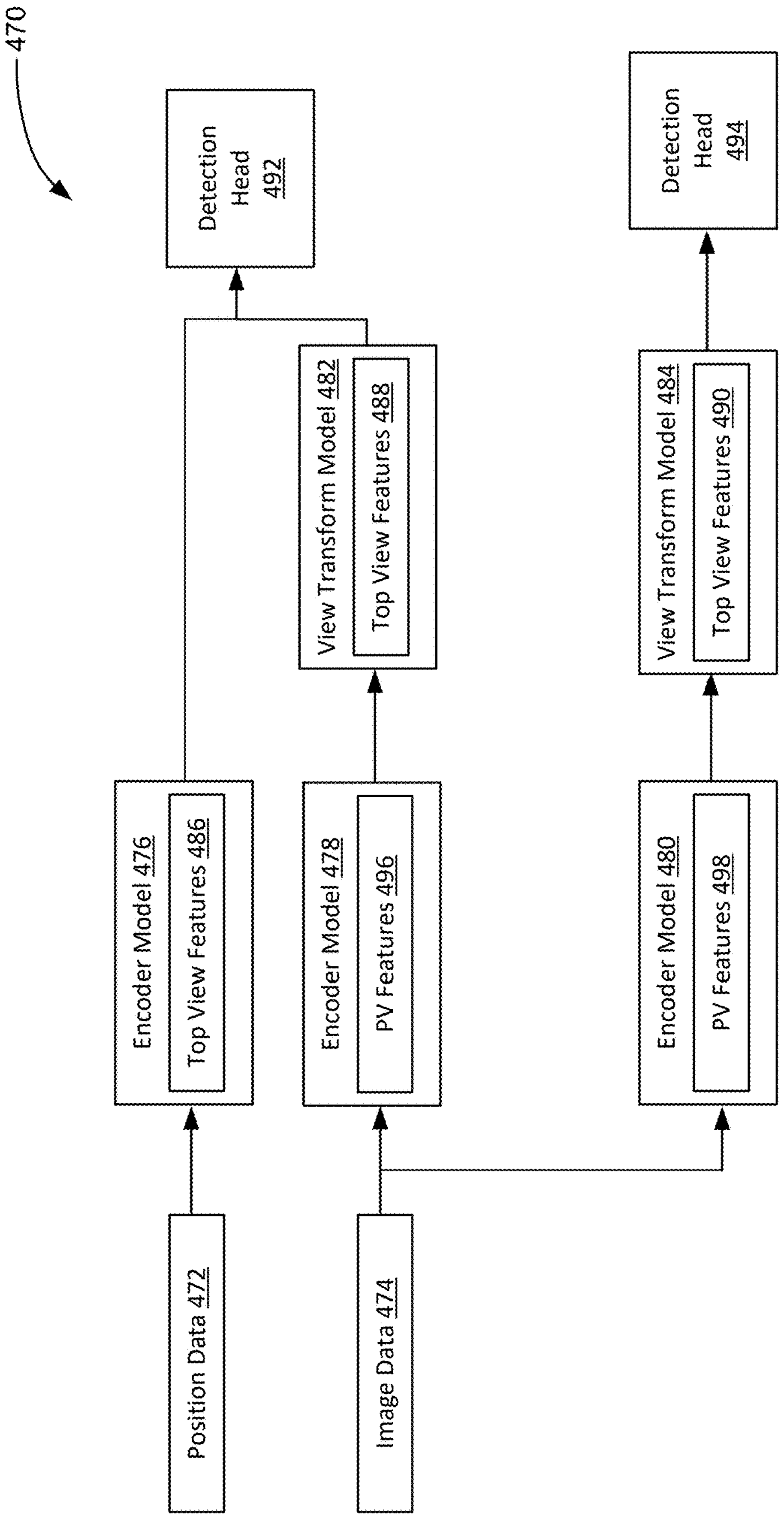
FIG. 4B is a block diagram illustrating a system for training machine learning models according to one or more aspects of the disclosure.

As one example, FIG. 4B depicts an example training operation 470 in which a teacher model is used to train a student model according to one aspect of the present disclosure. In particular, the training operation 470 may be performed to train the student model using the teacher model according to knowledge distillation techniques. The teacher model may include multiple models, including an encoder model 476, 478 and a view transform model 482. The student model may also include more than one machine learning model, including an encoder model 480 and a view transform model 484. Encoder models may be machine learning models trained to take input data (such as image data, position data) and encode the input into a lower-dimensional representation, which can be used for various downstream tasks such as classification or object detection. In certain implementations, encoder models may be implemented as neural networks (such as convolutional neural networks, recurrent neural networks), transformer models, autoencoder models, and the like. The teacher model and the student model each include a detection head 492, 494. The detection heads 492, 494 may be configured to make final predictions or determine final output features, such as object classification or localization, for the models.

During the training operation 470, the teacher model (which may have been previously trained to determine top view features based on sensor data captured for areas surrounding a vehicle) may receive position data 472 and image data 474. The encoder model 476 may be configured to receive the position data 472 and to determine top view features 486 based on the position data 472. The encoder model 478 may be configured to receive the image data 474 and to determine perspective view features 496 based on the image data 474. The view transform model 482 may then receive the perspective view features 496 from the encoder model 478 and may determine top view features 488 based on the perspective view features 496. For example, the view transform model 482 may be configured to project the perspective view features 496 into corresponding locations within a top view representation of an area surrounding the vehicle when determining the top view features 488. The detection head 492 may then receive the top view features 486 determined based on the position data and the top view features 488 determined based on the image data 474 by the teacher model.

The top view features 486, the perspective view features 496, the top view features 488, or a combination thereof may be considered an exemplary implementation of the initial feature data 416. In conventional knowledge distillation processes, the features 486, 488, 496 may be used to train the student model. In particular, the student model may be trained to determine top view features 490 based on the image data 474 and without receiving the position data 472. To do so, the encoder model 480 of the student model may receive the image data 474 and may determine perspective view features 498 based on the image data 474. The view transform model 484 may receive the perspective view features 498 from the encoder model 480 and may determine top view features 490 based on the perspective view features 498. The top view features 490 may then be received by a detection head 494 of the student model. The models 480, 484 of the student model may be trained based on corresponding features within the teacher model. In particular, the perspective view features 496 from the teacher model may be compared with the perspective view features 498 from the student model, and the encoder model 480 may be adjusted based on differences between the features 496, 498. Similarly, the top view features 488 may be compared with the top view features 490 of the student model, and the view transform model 484 may be adjusted based on differences between the features 488, 490.

Returning to FIG. 4A, in certain implementations, the first model 412 may be an exemplary implementation of the student network and the second model 414 may be an exemplary implementation of the teacher network. In certain implementations, training the first model 412 based on the second model 414 may be adjusted to account for the first data 408. For example, training of the first model 412 may be adjusted to correct for inaccuracies or errors in the initial feature data determined by the second model 414, such as inaccuracies caused by occluded data. Accordingly, in certain implementations, the computing device 402 may not directly train the first model 412 based on the second model 414 and the initial feature data 416. Instead, the computing device 402 may be configured to determine updated feature data 422 for at least a subset of the initial feature data 416.

In certain implementations, the computing device 402 may be configured to determine uncertainty measures 420 corresponding to portions of the initial feature data 416 and to determine the updated feature data 422 based on the initial feature data 416 and the uncertainty measures 420. In certain implementations, the updated feature data 422 may be determined using knowledge distillation, which may be weighted between the initial feature data 416 and the second data 410 based on corresponding uncertainty measures 420. For example, weights for particular features and particular locations may be determined based on a confidence of the second model 414 when predicting the features, as indicated by a corresponding uncertainty measure at the location. In certain implementations, where the uncertainty measures 420 indicate a higher confidence, knowledge distillation may be performed with a higher weight towards the initial feature data 416, and where the uncertainty measures indicate a lower confidence knowledge distillation may be performed with a higher weight towards feature data based on ground truth (such as features based on the second data 410). In certain implementations, the weighting can be gradient-based, region-based, or a combination thereof. In certain implementations, gradient-based weighting may include smoothly varying the weights across different areas of the feature data, allowing for nuanced adjustments depending on the specific regional features. In certain implementations, region-based weighting may apply uniform weights across pre-defined regions, ensuring consistency within those zones. In one particular implementation, the weight for an area or location within the first data 408 may be calculated as:

$$W_{i,x,y} = \exp\left(-\frac{(x_i - \bar{x}_i)^2 + (y_i - \bar{y}_i)^2}{2\sigma^2}\right) * U(x_i, y_i)$$

where:

$W_{i,x,y}$ is the weight at location $(x_i, y_i)$ in the first data 408 (such as the weight for features from the initial feature data 416 vs. features from ground truth data in the second data 410), and $U(x_i, y_i)$ is the uncertainty measure 420 at location $(x_i, y_i)$.

In certain such implementations, the Gaussian distribution of $W_{i,x,y}$ over each object center may create a heatmap, which can then be multiplied by binary bounding boxes to identify areas with higher uncertainty.

The uncertainty measures 420 may be determined using various techniques. In certain implementations, the uncertainty measures 420 can be based on error variance in the first data 408. In certain implementations, error variance, which may also be known as aleatoric uncertainty, may be determined by predicting both the mean and variance for each feature point, such as using a likelihood-based loss function. For example, using a Gaussian distribution, the likelihood-based loss function may predict the mean and variance for each data point, where the predicted variance ((\sigma—2)) represents the uncertainty. In one such implementation, the likelihood-based loss function may be:

$$L = -\log p\left(y_i \mid f^{W_i}(x_i)\right) \propto \frac{1}{2\sigma^2}\left\|y_i - f^{W_i}(x_i)\right\|^2 + \frac{1}{2}\log\sigma^2$$

where:

L is the loss function, $y_i$ is ground truth data, taken from the second data 410, $x_i$ is input data from the first data 408, $f^{W_i}(x_i)$ is the predicted feature from the initial feature data, and $\sigma^2$ is the standard deviation for the predicted features.

In additional or alternative implementations, the uncertainty measures 420 may be determined based on estimation variance in the second model 414. In certain implementations, estimation variance, which may also be known as epistemic uncertainty, may be determined using techniques such as model dropout, training multiple models using different subsets of the training data (ensemble learning), generating multiple model checkpoints at different stages of training, or a combination thereof. In certain implementations, model dropout may include randomly disabling a fraction of neurons in the model 414 to produce a distribution of predictions. By averaging these predictions, variance can be computed to quantify the estimation variance and the uncertainty measure 420. Relatedly, multiple model checkpoints may be determined by retaining multiple versions of the model 414 in different stages of the training process or multiple versions of the model 414 trained using different subsets of training data. The multiple versions of the model 414 may then be used to determine a plurality of predictions for the initial feature data 416. A variance between the plurality of predictions may then be determined to indicate the estimation variance and the uncertainty measure.

In certain implementations, the computing device 402 may be configured to determine a single uncertainty measure 420, such as using error variance techniques or estimation variance techniques. In additional or alternative implementations, the computing device 402 may be configured to determine and combine multiple forms of uncertainty measures 420. For example, a total uncertainty measure for a point may be determined as a sum or weighted combination of error variance and estimation variance. In one specific implementation, if both an error variance and an estimation variance are modeled as Gaussian distributions with respective means and variances, the combined uncertainty for a prediction can be calculated by summing these variances (such as a weighted combination). For example, a combined uncertainty measure 420 may be determined as:

$$U(x_i, y_i) = \alpha ErrV(x_i, y_i) + \beta EstV(x_i, y_i)$$

where:

$U(x_i, y_i)$ is the uncertainty measure 420 at location $x_i$, $y_i$, $\alpha$ and $\beta$ are weights (for example, where $\alpha+\beta=1$, ErrV is the error variance at location $x_i$, $y_i$, and EstV is the estimation variance at location $x_i$, $y_i$.

In certain implementations, ErrV and EstV may be normalized before determining $U(x_i, y_i)$.

In certain implementations, the computing device 402 may be configured to determine the updated feature data using other techniques. For example, in certain implementations, the computing device 402 may be configured to determine occluded regions 418 within the first data 408 and may be configured to determine updated feature data 422 for objects corresponding to the occluded regions 418. In certain implementations, the occluded regions 418 may include a mask or other indication of portions of the first data 408 that are occluded. In implementations w"ere 'he first data 408 includes multiple frames of data, the occluded regions 418 may"be i'entified on a per-frame basis.

Figure 4C:
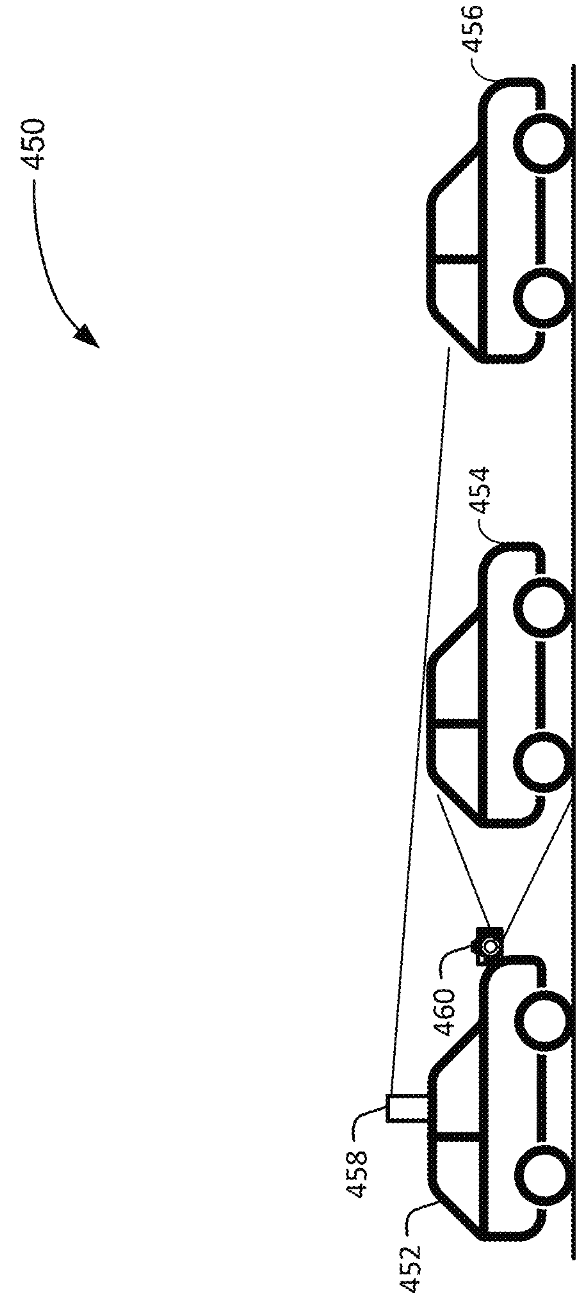
FIG. 4C is a scenario for capturing sensor data according to one aspect of the present disclosure.

In certain implementations, occluded regions 418 may include areas within the first data 408 that are not clearly visible or are obstructed due to objects or environmental factors. For example, FIG. 4C depicts a scenario 450 in which sensors 458, 460 are capturing data for an area surrounding a first vehicle 452. There are two vehicles 454, 456 in front of the first vehicle 452. Both sensors 458, 460 have a view of and are able to capture data regarding a second vehicle 454 that is directly in front of the first vehicle 452. However, due to the lower placement of the sensor 460 on the vehicle 452, the sensor 460 does not have a view of the third vehicle 456, which is in front of the second vehicle 454. In particular, the second vehicle 454 occludes the view of the third vehicle 456 for the sensor 460. However, the sensor 458 is positioned higher on the first vehicle 452 and, as a result, has at least a partial view of the third vehicle 456.

Returning to FIG. 4A, in certain implementations, the occluded regions 418 are determined based on the first data 408, the second data 410, or a combination thereof. For example, the occluded regions 418 may be determined based on discrepancies between the first data 408 and the second data 410. As another example, the occluded regions 418 may be determined using geometric analysis and sensory data integration. As one specific example, occluded regions 418 can be identified by comparing the depth information from position data with visual information from image data. Areas where the visual data lacks corresponding depth information or shows significant depth discrepancies may be identified as occluded regions 418. Alternatively, segmentation techniques may be used to detect objects within the image data, and corresponding depth information from position data may be analyzed to identify occluded regions 418. As another example, motion patterns between consecutive frames of the first data 408 and the second data 410 may be analyzed. By tracking the movement of objects across frames, the system may detect areas that consistently lack visual data due to dynamic obstructions. For example, a moving vehicle may temporarily obscure parts of the image frame, causing these regions to be identified as occluded.

The updated feature data 422 may be determined for objects occluded in the first data 408, as indicated by the occluded regions 418. For example, the updated feature data 422 may be determined using focal distillation for points within the first data 408 based on corresponding points within the second data 410. In certain implementations, corresponding points within the first data 408 and the second data 410 may be identified by aligning spatial coordinates and features within the first data 408 and the second data 410. The corresponding points may represent the same or similar physical locations, as separately indicated within the first data 408 and the second data 410. In certain implementations, focal distillation may be a technique for knowledge distillation that focuses attention on specific points within the first data 408 to improve feature learning between the second model 414 and the first model 412. For example, for each query point (Q) in an occluded region 418, a reference point may be determined (such as by a Multi-Layer Perceptron (MLP) of a corresponding query feature from the first data 408). K sampling offsets may then be predicted (such as by a corresponding attention head). Distillation may then be performed between features within the second from the second model 414 and features within the first data 408 for the first model 412 across the query points. Accordingly, knowledge distillation in occluded regions 418 may be performed with a greater emphasis on the second data 410 (which may not be occluded) than on the first data 408 (which may be occluded). This may improve the accuracy when training the first model 408 by avoiding knowledge distillation within the occluded, and therefore less accurate, regions.

In certain implementations, the occluded regions 418, the updated feature data 422, or a combination thereof may be determined at least in part based on information received from other vehicles. For example, information may be received at a vehicle via a network connection (such as to a base station), a vehicle-to-vehicle connection, or a combination thereof. In certain implementations, the received information may include indications of occluded regions 418 near the vehicle. In additional or alternative implementations, the received information may include sensor data captured from behind an object causing the occlusion (such as to be used as ground truth data instead of or in addition to the second data 410).

As noted above, the computing device 402 may be configured to determine the updated feature data 422 based on the uncertainty measures 420, the occluded regions 418, or a combination thereof. Notably, as detailed above, when determining the updated feature data 422 based on the uncertainty measures 420, perspective view features of the initial feature data 416 may be adjusted. In certain implementations, when determining the updated feature data 422 based on the occluded regions 418, top view features of the initial feature 416 may be adjusted. In implementations where both the uncertainty measures 420 and the occluded regions 418 are used to determine the updated feature data 422, both perspective view features and the top view features of the initial feature data 416 may be adjusted.

In certain implementations, the computing device may be configured to select or otherwise toggle between determining the updated feature data 422 based on the occluded regions 418, based on the uncertainty measures 420, or based on a combination thereof. Occlusion-aware distillation may be primarily utilized when the computing device 402 identifies regions within the first data 408 that are occluded, such as more than a threshold portion of the first data 408 being occluded. When occlusion is detected, the computing device 402 may be configured to prioritize determining the updated feature data 422 based on the occluded regions 418. On the other hand, uncertainty-based distillation may be primarily utilized when the computing device 402 determines that the second model 414 exhibits high levels of uncertainty in its predictions. When high uncertainty is detected, the computing device 402 may be configured to prioritize determining the updated feature data 422 based on the uncertainty measures 420. The computing device may implement the selected distillation strategy" thro'gh a dynamic toggling mechanism that activates one form of distillation while disabling the other. This can be achieved by utilizing conditional statements within the distillation process, which evaluate the predefined criteria such as occluded regions or uncertainty measures. For instance, an occlusion flag may trigger the occlusion-aware distillation module and an uncertainty flag may trigger the uncertainty-based distillation.

The computing device 402 may be configured to train a first model 412 based on the updated feature data 422. For example, the first data 408 and the updated feature data 422 can be used as a training dataset for the first model 412. In particular, the first model 412 may receive the first data 408 as input. The first model 412 may generate outputs such as perspective features and top view features based on the first data 408, and these outputs may be compared to the corresponding features in the updated feature data 422. In particular, the predicted features generated by the first model 412 may be compared to corresponding features within the updated feature data 422, and one or more parameter updates may be computed based on differences between the predicted features and the expected features. These parameter updates may involve updating one or more of the features analyzed by the model and/or the weights assigned to different features or combinations of features (e.g., relative to the current configuration of the first model 412).

In certain implementations, the first model 412 may be used to determine vehicle control instructions for a vehicle, such as the vehicle 100. In certain implementations, vehicle control instructions may refer to the set of commands and guidelines that directly or indirectly regulate the movement of a vehicle. These instructions may come in the form of direct vehicular control instructions, such as steering, braking, accelerating or combinations thereof. In additional or alternative implementations, vehicle control instructions may be supplementary instructions that support driver assistance programs, such as obstacle avoidance, blind spot monitoring, and other driver assistance alerts. In still further implementations, vehicle control instructions may include instructions to present feedback to one or more occupants of the vehicle, such as visual feedback, auditory feedback, tactile feedback, or a combination thereof. In such instances, the feedback may be presented to an operator of the vehicle, an owner of the vehicle, a passenger of the vehicle, another individual, or a combination thereof. Vehicle control instructions may accordingly help drivers to maintain safe operation of vehicles while driving on roads and highways.

The models 412, 414 may be implemented as one or more machine learning models, including supervised learning models, unsupervised learning models, other types of machine learning models, and/or other types of predictive models. For example, the models 412, 414 may be implemented as one or more of a neural network, a transformer model, a decision tree model, a support vector machine, a Bayesian network, a classifier model, a regression model, and the like.

In certain implementations, the first model 412 may be one of a plurality of models used by the computing device 402. The plurality of models may include multiple models for use in the same vehicle, multiple models for use across separate vehicles, or combinations thereof. For example, different models may be trained for use in different operating conditions. For instance, the system may switch to a model optimized for low-light conditions when it detects a decrease in ambient light, relying on models specifically trained for night-time driving. Similarly, the plurality of models may be trained to use different types of sensor data, or different arrangements of sensors on a vehicle. For instance, a model may be trained for use with vehicles equipped with a combination of cameras while another model may be trained for use with vehicles equipped with front-facing cameras and LiDAR sensors.

Figure 5:
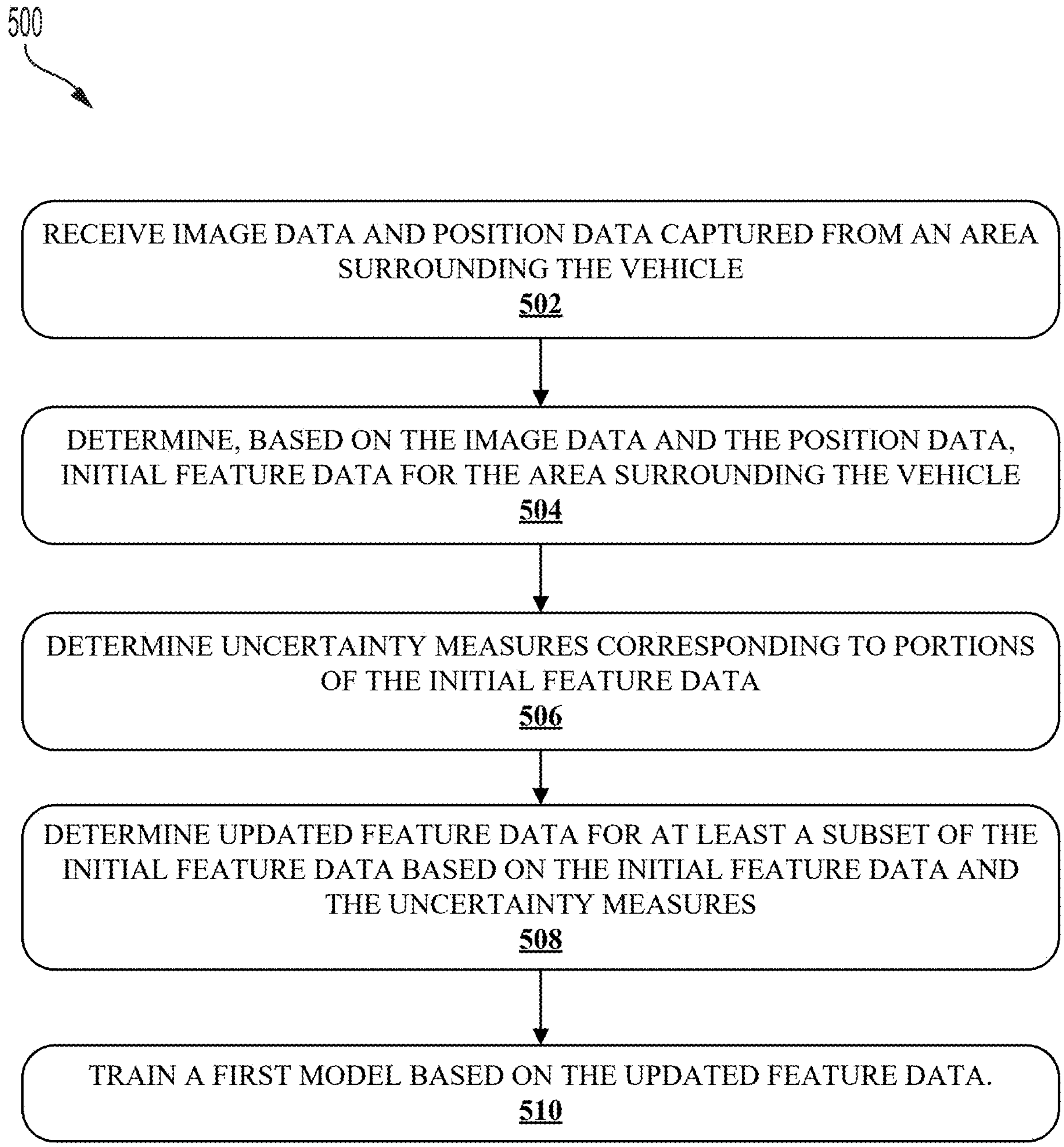
FIGS. 5-8 are flow charts illustrating example methods for training machine learning models according to one or more aspects of the disclosure.

One method of model training using knowledge distillation according to embodiments described above is shown in FIG. 5. FIG. 5 is a flow chart illustrating an example method 500.

The method 500 includes receiving image data and position data captured from an area surrounding the vehicle (block 502). For example, the computing device 402 may receive first data 408 captured by an image sensor and second data 410 captured by a position sensor. The first data 408 and the second data 410 may be captured from an area surrounding the vehicle.

The method 500 includes determining, based on the image data and the position data, initial feature data for the area surrounding the vehicle (block 504). For example, the computing device 402 may determine, based on the image data and the position data, initial feature data 416 for the area surrounding the vehicle. In certain implementations, the initial feature data 416 may be determined by a second model 414.

The method 500 includes determining uncertainty measures corresponding to portions of the initial feature data (block 506). For example, the computing device 402 may determine uncertainty measures 420 corresponding to portions of the initial feature data 416 (such as particular features or locations within the initial feature data 416).

The method 500 includes determining updated feature data for at least a subset of the initial feature data based on the initial feature data and the uncertainty measures (block 508). For example, the computing device 402 may determine updated feature data 422 for at least a subset of the initial feature data 416 based on the initial feature data 416 and the uncertainty measures 420. In certain implementations, the updated feature data 422 may be determined using feature distillation, the feature distillation may be weighted between the initial feature data 416 and the position data 410 based on corresponding uncertainty measures 420. In certain implementations, the initial feature data 416 may include perspective view features, and the updated feature data 411 may be determined by adjusting or otherwise changing at least a portion of the perspective view features within the initial feature data 416.

The method 500 includes training a first model based on the updated feature data (block 510). For example, the computing device 402 may train a first model 412 based on the updated feature data 422, such as using knowledge distillation techniques.

Figure 6:
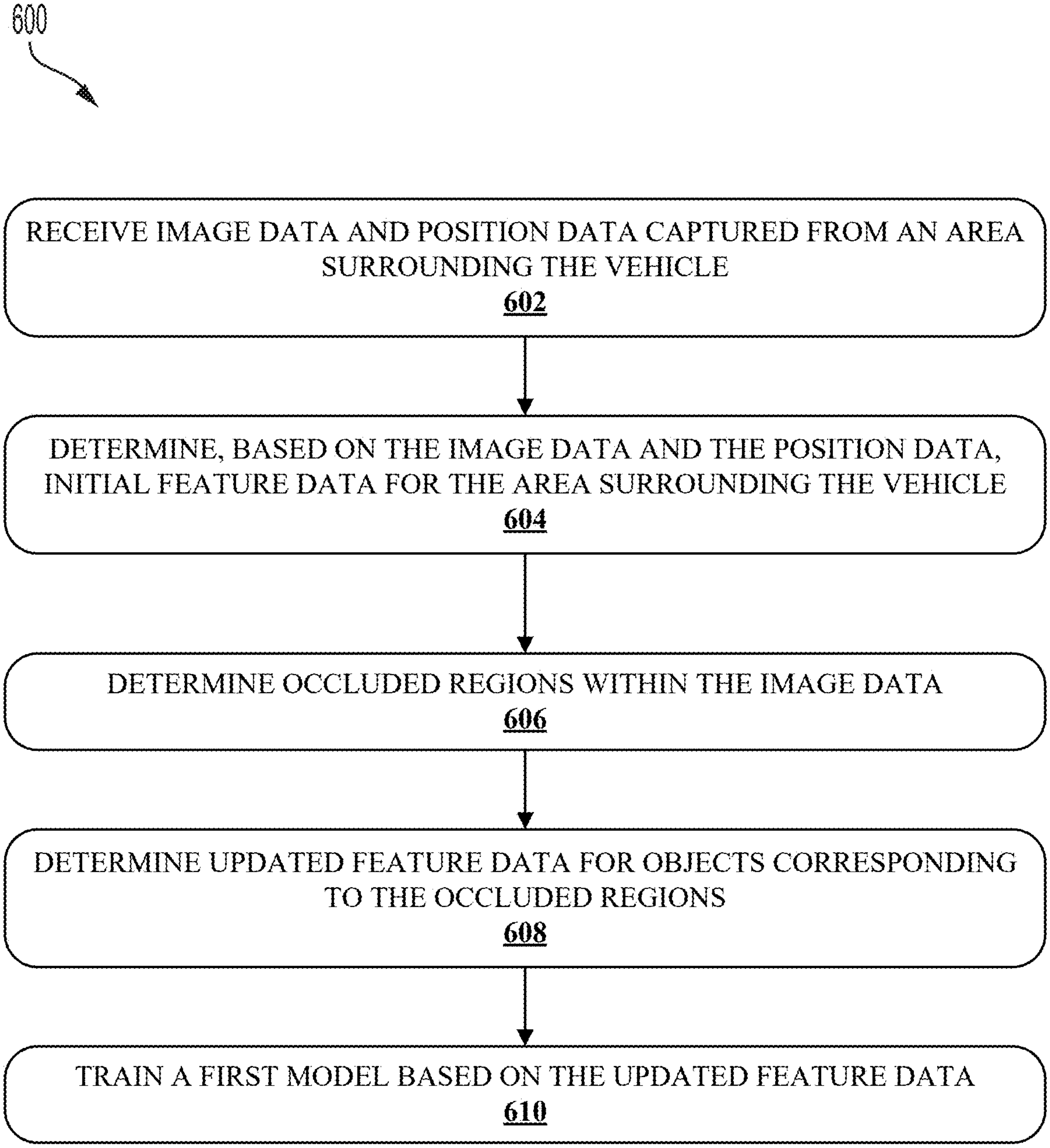

One method of model training using knowledge distillation according to embodiments described above is shown in FIG. 6. FIG. 6 is a flow chart illustrating an example method 600.

The method 600 includes receiving image data and position data captured from an area surrounding the vehicle (block 602). For example, the computing device 402 may receive image data 408 and position data 410 captured from an area surrounding the vehicle.

The method 600 includes determining, based on the image data and the position data, initial feature data for the area surrounding the vehicle (block 604). For example, the computing device 402 may determine, based on the image data 408 and the position data 410, initial feature data 416 for the area surrounding the vehicle. In certain implementations, the initial feature data 416 may be determined by a second model 414.

The method 600 includes determining occluded regions within the image data (block 606). For example, the computing device 402 may determine occluded regions 418 within the image data 408.

The method 600 includes determining updated feature data for objects corresponding to the occluded regions (block 608). For example, the computing device 402 may determine updated feature data 422 for objects corresponding to the occluded regions 418. In certain implementations, the initial feature data 416 may include one or more top view features, and determining the updated feature data 422 may include adjusting or otherwise changing at least a portion of the top view features within the initial feature data 416.

The method 600 includes training a first model based on the updated feature data (block 610). For example, the computing device 402 may train a first model 412 based on the updated feature data 422, such as using knowledge distillation techniques.

Figure 7:
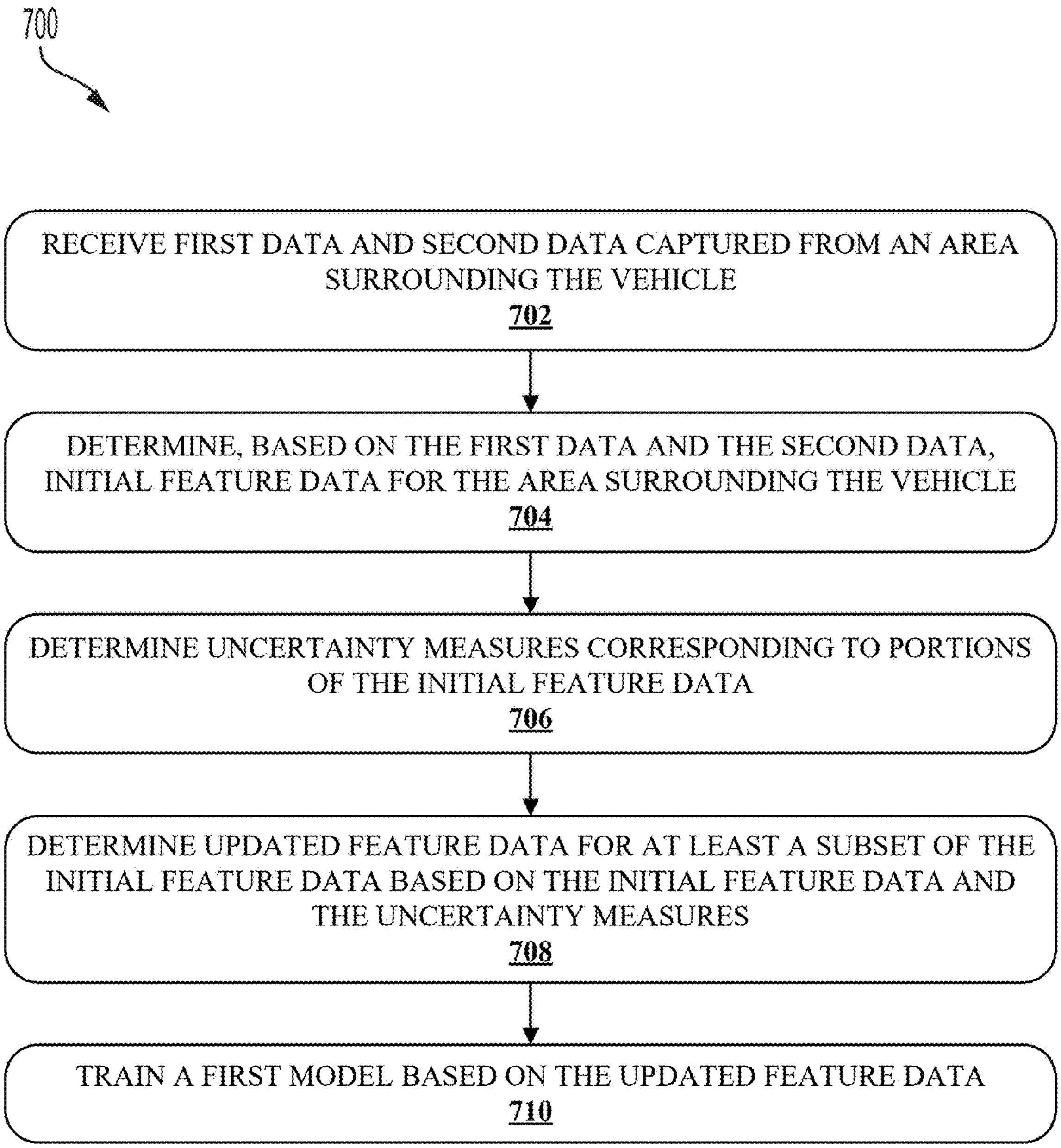

One method of model training using knowledge distillation according to embodiments described above is shown in FIG. 7. FIG. 7 is a flow chart illustrating an example method 700.

The method 700 includes receiving first data and second data captured from an area surrounding the vehicle (block 702). For example, the computing device 402 may receive first data 408 and second data 410 captured from an area surrounding the vehicle. The first data 408 may be captured by a first sensor and the second data 410 may be captured by a second sensor. In certain implementations, the first sensor and the second sensor may be different types of sensors.

The method 700 includes determining, based on the first data and the second data, initial feature data for the area surrounding the vehicle (block 704). For example, the computing device 402 may determine, based on the first data 408 and the second data 410, initial feature data 416 for the area surrounding the vehicle. In certain implementations, the initial feature data 416 may be determined by a second model 414.

The method 700 includes determining uncertainty measures corresponding to portions of the initial feature data (block 706). For example, the computing device 402 may determine uncertainty measures 420 corresponding to portions of the initial feature data 416.

The method 700 includes determining updated feature data for at least a subset of the initial feature data based on the initial feature data and the uncertainty measures (block 708). For example, the computing device 402 may determine updated feature data 422 for at least a subset of the initial feature data 416 based on the initial feature data 416 and the uncertainty measures 420. In certain implementations, the updated feature data 422 may be determined using feature distillation, the feature distillation may be weighted between the initial feature data 416 and the second data 410 based on corresponding uncertainty measures 420. In certain implementations, the initial feature data 416 may include perspective view features, and the updated feature data 411 may be determined by adjusting or otherwise changing at least a portion of the perspective view features within the initial feature data 416.

The method 700 includes training a first model based on the updated feature data (block 710). For example, the computing device 402 may train a first model 412 based on the updated feature data 422, such as using knowledge distillation techniques.

Figure 8:
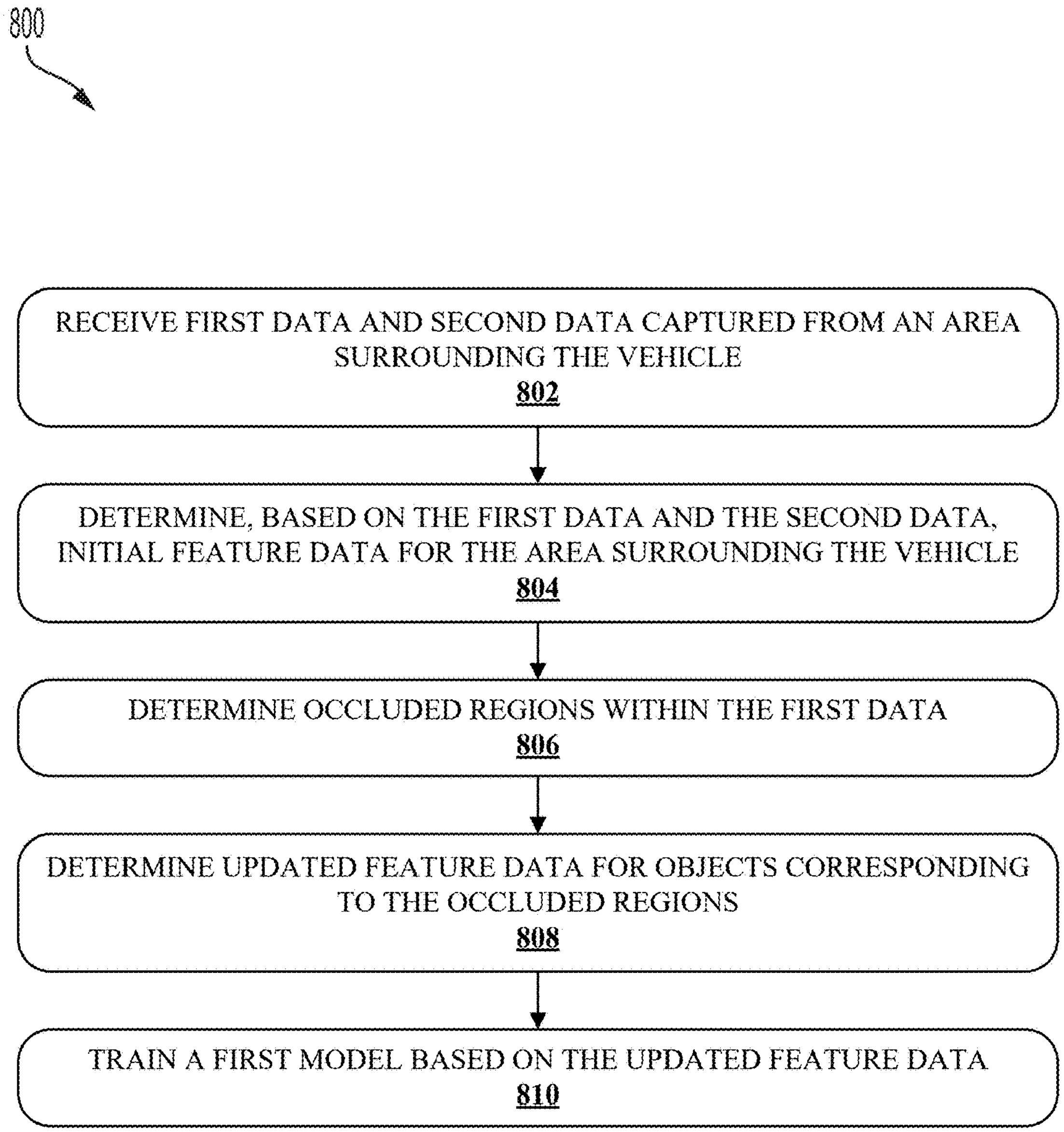

One method of model training using knowledge distillation according to embodiments described above is shown in FIG. 8. FIG. 8 is a flow chart illustrating an example method 800.

The method 800 includes receiving first data and second data captured from an area surrounding the vehicle (block 802). For example, the computing device 402 may receive first data 408 and second data 410 captured from an area surrounding the vehicle. The first data 408 may be captured by a first sensor and the second data 410 may be captured by a second sensor. In certain implementations, the first sensor and the second sensor may be different types of sensors.

The method 800 includes determining, based on the first data and the second data, initial feature data for the area surrounding the vehicle (block 804). For example, the computing device 402 may determine, based on the first data 408 and the second data 410, initial feature data 416 for the area surrounding the vehicle. In certain implementations, the initial feature data 416 may be determined by a second model 414.

The method 800 includes determining occluded regions within the first data (block 806). For example, the computing device 402 may determine occluded regions 418 within the first data 408.

The method 800 includes determining updated feature data for objects corresponding to the occluded regions (block 808). For example, the computing device 402 may determine updated feature data 422 for objects corresponding to the occluded regions 418. In certain implementations, the initial feature data 416 may include one or more top view features, and determining the updated feature data 422 may include adjusting or otherwise changing at least a portion of the top view features within the initial feature data 416.

The method 800 includes training a first model based on the updated feature data (block 810). For example, the computing device 402 may train a first model 412 based on the updated feature data 422, such as using knowledge distillation techniques.

It is noted that one or more blocks (or operations) described with reference to FIGS. 5-8 may be combined with one or more blocks (or operations) described with reference to another of the figures. For example, one or more blocks (or operations) of FIG. 5 may be combined with one or more blocks (or operations) of FIG. 1-3. As another example, one or more blocks associated with FIG. 5 may be combined with one or more blocks associated with FIGS. 6-8.

In one or more aspects, techniques for supporting vehicular operations may include additional aspects, such as any single aspect or any combination of aspects described below or in connection with one or more other processes or devices described elsewhere herein.

A first aspect provides a method comprising receiving image data and position data captured from an area surrounding a vehicle; determining, based on the image data and the position data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

In a second aspect according to the first aspect, the updated feature data is determined using knowledge distillation, wherein the knowledge distillation is weighted between the initial feature data and the position data based on corresponding uncertainty measures.

In a third aspect according to the second aspect, the uncertainty measure is determined based on error variance in the image data.

In a fourth aspect according to the third aspect, the uncertainty measure is determined by applying a likelihood-based loss function to the image data.

In a fifth aspect according to any of the second aspect through the fourth aspect, the initial feature data is determined by a second model, and the uncertainty measure is determined based on estimation variance in the second model.

In a sixth aspect according to any of the first aspect through the fifth aspect, determining the updated feature data comprises determining updated perspective features for the initial feature data.

In a seventh aspect according to any of the first aspect through the sixth aspect, further comprising determining occluded regions within the image data, wherein determining the updated feature data further comprises determining the updated feature data for objects corresponding to the occluded regions.

In an eighth aspect according to the seventh aspect, the updated feature data is determined using focal distillation for points within the image data based on corresponding points within the position data.

In a ninth aspect according to any of the seventh aspect through the eighth aspect, the occluded regions are determined based on the image data, the position data, or a combination thereof.

In a tenth aspect according to any of the first aspect through the ninth aspect, determining the updated feature data comprises determining, based on the uncertainty measures, the updated feature data (i) based on knowledge distillation, (ii) based on occluded regions within the image data, or (iii) a combination thereof.

An eleventh aspect provides a method comprising receiving image data and position data captured from an area surrounding a vehicle; determining, based on the image data and the position data, initial feature data for the area surrounding the vehicle; determining occluded regions within the image data; determining updated feature data for objects corresponding to the occluded regions; and training a first model based on the updated feature data.

In a twelfth aspect according to the eleventh aspect, the updated feature data is determined using focal distillation for points within the image data based on corresponding points within the position data.

In a thirteenth aspect according to the eleventh aspect, the occluded regions are determined based on the image data, the position data, or a combination thereof.

In a fourteenth aspect according to any of the eleventh aspect through the thirteenth aspect, further comprising determining uncertainty measures corresponding to portions of the initial feature data, wherein determining the updated feature data comprises determining the updated feature data for at least a subset of the initial feature data based on the initial feature data and the uncertainty measures.

In a fifteenth aspect according to the fourteenth aspect, the updated feature data is determined using knowledge distillation, wherein the knowledge distillation is weighted between the initial feature data and the position data based on corresponding uncertainty measures.

In a sixteenth aspect according to the fifteenth aspect, the uncertainty measure is determined based on error variance in the image data.

In a seventeenth aspect according to the sixteenth aspect, the uncertainty measure is determined by applying a likelihood-based loss function to the image data.

In an eighteenth aspect according to any of the fifteenth aspect through the seventeenth aspect, the initial feature data is determined by a second model, and the uncertainty measure is determined based on estimation variance in the second model.

In a nineteenth aspect according to any of the fourteenth aspect through the eighteenth, determining the updated feature data comprises determining updated perspective features for the initial feature data.

In a twentieth aspect according to any of the eleventh aspect through the nineteenth aspect, determining the updated feature data comprises determining, based on the uncertainty measures, the updated feature data (i) based on knowledge distillation, (ii) based on occluded regions within the image data, or (iii) a combination thereof.

A twenty-first aspect provides an apparatus, comprising an image sensor configured to capture image data for an area surrounding a vehicle; a position sensor configured to capture position data for the area surrounding the vehicle; a memory storing processor-readable code; and at least one processor coupled to the memory, the image sensor, and the position sensor, the at least one processor configured to execute the processor-readable code to cause the at least one processor to perform operations including receiving image data and position data captured from an area surrounding the vehicle; determining, based on the image data and the position data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a twenty-second aspect according to the twenty-first aspect, the updated feature data is determined using knowledge distillation, wherein the knowledge distillation is weighted between the initial feature data and the position data based on corresponding uncertainty measures.

In a twenty-third aspect according to the twenty-second aspect, the uncertainty measure is determined based on error variance in the image data.

In a twenty-fourth aspect according to the twenty-third aspect, the uncertainty measure is determined by applying a likelihood-based loss function to the image data.

In a twenty-fifth aspect according to any of the twenty-second aspect through the twenty-fourth aspect, the initial feature data is determined by a second model, and the uncertainty measure is determined based on estimation variance in the second model.

In a twenty-sixth aspect according to any of the twenty-first aspect through the twenty-fifth aspect, determining the updated feature data comprises determining updated perspective features for the initial feature data.

In a twenty-seventh aspect according to any of the twenty-first aspect through the twenty-sixth, the operations further comprise determining occluded regions within the image data, wherein determining the updated feature data further comprises determining the updated feature data for objects corresponding to the occluded regions.

In a twenty-eighth aspect according to the twenty-seventh aspect, the updated feature data is determined using focal distillation for points within the image data based on corresponding points within the position data.

In a twenty-ninth aspect according to any of the twenty-seventh aspect through the twenty-eighth, the occluded regions are determined based on the image data, the position data, or a combination thereof.

A thirtieth aspect provides an apparatus, comprising an image sensor configured to capture image data for an area surrounding a vehicle; a position sensor configured to capture position data for the area surrounding the vehicle; a memory storing processor-readable code; and at least one processor coupled to the memory, the image sensor, and the position sensor, the at least one processor configured to execute the processor-readable code to cause the at least one processor to perform operations including receiving image data and position data captured from an area surrounding the vehicle; determining, based on the image data and the position data, initial feature data for the area surrounding the vehicle; determining occluded regions within the image data; determining updated feature data for objects corresponding to the occluded regions; and training a first model based on the updated feature data.

In some implementations, the apparatus includes a wireless device, such as a UE. In some implementations, the apparatus may include at least one processor, and a memory coupled to the processor. The processor may be configured to perform operations described herein with respect to the apparatus. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a thirty-first aspect according to the thirtieth aspect, the updated feature data is determined using focal distillation for points within the image data based on corresponding points within the position data.

In a thirty-second aspect according to any of the thirtieth aspect through the thirty-first aspect, the occluded regions are determined based on the image data, the position data, or a combination thereof.

In a thirty-third aspect according to any of the thirtieth aspect through the thirty-second aspect, the operations further comprise determining uncertainty measures corresponding to portions of the initial feature data, wherein determining the updated feature data comprises determining the updated feature data for at least a subset of the initial feature data based on the initial feature data and the uncertainty measures.

In a thirty-fourth aspect according to the thirty-third aspect, the updated feature data is determined using knowledge distillation, wherein the knowledge distillation is weighted between the initial feature data and the position data based on corresponding uncertainty measures.

In a thirty-fifth aspect according to the thirty-fourth aspect, the uncertainty measure is determined based on error variance in the image data.

In a thirty-sixth aspect according to the thirty-fifth aspect, the uncertainty measure is determined by applying a likelihood-based loss function to the image data.

In a thirty-seventh aspect according to any of the thirty-fourth aspect through the thirty-sixth aspect, the initial feature data is determined by a second model, and the uncertainty measure is determined based on estimation variance in the second model.

In a thirty-eighth aspect according to any of the thirty-third aspect through the thirty-seventh aspect, determining the updated feature data comprises determining updated perspective features for the initial feature data.

A thirty-ninth aspect includes a non-transitory computer-readable medium storing instructions that, when executed by a processor, cause the processor to perform operations comprising receiving image data and position data captured from an area surrounding a vehicle; determining, based on the image data and the position data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

In a fortieth aspect according to the thirty-ninth aspect, the updated feature data is determined using knowledge distillation, wherein the knowledge distillation is weighted between the initial feature data and the position data based on corresponding uncertainty measures.

In a forty-first aspect according to the fortieth aspect, the uncertainty measure is determined based on error variance in the image data.

In a forty-second aspect according to the forty-first aspect, the uncertainty measure is determined by applying a likelihood-based loss function to the image data.

In a forty-third aspect according to any of the fortieth aspect through the forty-second aspect, the initial feature data is determined by a second model, and the uncertainty measure is determined based on estimation variance in the second model.

In a forty-fourth aspect according to any of the thirty-ninth aspect through the forty-third aspect, determining the updated feature data comprises determining updated perspective features for the initial feature data.

In a forty-fifth aspect according to any of the thirty-ninth aspect through the forty-fourth aspect, the operations further comprise determining occluded regions within the image data, wherein determining the updated feature data further comprises determining the updated feature data for objects corresponding to the occluded regions.

In a forty-sixth aspect according to the forty-fifth aspect, the updated feature data is determined using focal distillation for points within the image data based on corresponding points within the position data.

In a forty-seventh aspect according to the forty-fifth aspect, the occluded regions are determined based on the image data, the position data, or a combination thereof.

A forty-eighth aspect includes a non-transitory computer-readable medium storing instructions that, when executed by a processor, cause the processor to perform operations comprising receiving image data and position data captured from an area surrounding a vehicle; determining, based on the image data and the position data, initial feature data for the area surrounding the vehicle; determining occluded regions within the image data; determining updated feature data for objects corresponding to the occluded regions; and training a first model based on the updated feature data.

In a forty-ninth aspect according to the forty-eighth aspect, the updated feature data is determined using focal distillation for points within the image data based on corresponding points within the position data.

In a fiftieth aspect according to any of the forty-eighth aspect through the forty-ninth aspect, the occluded regions are determined based on the image data, the position data, or a combination thereof.

In a fifty-first aspect according to any of the forty-eighth aspect through the fiftieth aspect, the operations further comprise determining uncertainty measures corresponding to portions of the initial feature data, wherein determining the updated feature data comprises determining the updated feature data for at least a subset of the initial feature data based on the initial feature data and the uncertainty measures.

In a fifty-second aspect according to the fifty-first aspect, the updated feature data is determined using knowledge distillation, wherein the knowledge distillation is weighted between the initial feature data and the position data based on corresponding uncertainty measures.

In a fifty-third aspect according to the fifty-second aspect, the uncertainty measure is determined based on error variance in the image data.

In a fifty-fourth aspect according to the fifty-third aspect, the uncertainty measure is determined by applying a likelihood-based loss function to the image data.

In a fifty-fifth aspect according to any of the fifty-second aspect through the fifty-fourth aspect, the initial feature data is determined by a second model, and the uncertainty measure is determined based on estimation variance in the second model.

In a fifty-sixth aspect according to any of the fifty-first aspect through the fifty-fifth aspect, determining the updated feature data comprises determining updated perspective features for the initial feature data.

A fifty-seventh aspect provides a method comprising receiving first data and second data captured from an area surrounding a vehicle; determining, based on the first data and the second data, initial feature data for the area surrounding the vehicle; determining uncertainty measures corresponding to portions of the initial feature data; determining updated feature data for at least a subset of the initial feature data based on the initial feature data and the uncertainty measures; and training a first model based on the updated feature data.

A fifty-eighth aspect provides a method comprising receiving first data and second data captured from an area surrounding a vehicle; determining, based on the first data and the second data, initial feature data for the area surrounding the vehicle; determining occluded regions within the first data; determining updated feature data for objects corresponding to the occluded regions; and training a first model based on the updated feature data.

Components, the functional blocks, and the modules described herein with respect to FIGS. 1-4 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method comprising:

receiving image data and position data captured from an area surrounding a vehicle;

determining, by a first model based on the image data and the position data, initial feature data for the area surrounding the vehicle;

determining uncertainty measures corresponding to portions of the initial feature data, wherein the uncertainty measures are determined based on error variance in the image data;

determining updated feature data for at least a subset of the initial feature data based on the initial feature data and the uncertainty measures, wherein determining the updated feature data comprises determining updated perspective features for the initial feature data, wherein the updated feature data is determined using knowledge distillation, the knowledge distillation being weighted between the initial feature data and the position data based on the uncertainty measures, wherein the knowledge distillation is weighted based on the uncertainty measures such that:

when the uncertainty measures indicating a confidence meets a first threshold, the knowledge distillation is performed with a higher weight towards the initial feature data; and when the uncertainty measures indicating the confidence meets a second threshold, the knowledge distillation is performed with a higher weight towards the position data; and training a second model based on the updated feature data.

2. The method of claim 1, further comprising determining occluded regions within the image data, wherein determining the updated feature data further comprises determining the updated feature data for objects corresponding to the occluded regions.

3. The method of claim 2, wherein the updated feature data is determined using focal distillation for points within the image data based on corresponding points within the position data.

4. The method of claim 2, wherein the occluded regions are determined based on the image data, the position data, or a combination thereof.

5. The method of claim 1, wherein determining the updated feature data comprises determining, based on the uncertainty measures, the updated feature data (i) based on knowledge distillation, (ii) based on occluded regions within the image data, or (iii) a combination thereof.

6. The method of claim 1, wherein the uncertainty measures are determined based on error variance in the image data.

7. The method of claim 6, wherein the uncertainty measures are determined by applying a likelihood-based loss function to the image data.

8. The method of claim 1, wherein the uncertainty measures are determined based on estimation variance in the first model.

9. A method comprising:

receiving image data and position data captured from an area surrounding a vehicle;

determining, by a first model based on the image data and the position data, initial feature data for the area surrounding the vehicle;

determining occluded regions within the image data;

determining uncertainty measures corresponding to portions of the initial feature data, wherein the uncertainty measures are determined based on error variance in the image data;

determining updated feature data for objects corresponding to the occluded regions, wherein determining the updated feature data comprises determining updated top-view features for the initial feature data, wherein determining the updated feature data comprises determining the updated feature data for at least a subset of the initial feature data based on the initial feature data and the uncertainty measures using knowledge distillation, wherein the knowledge distillation is weighted between the initial feature data and the position data based on the uncertainty measures, wherein the knowledge distillation is weighted based on the uncertainty measures such that:

when the uncertainty measures indicating a confidence meets a first threshold, the knowledge distillation is performed with a higher weight towards the initial feature data; and when the uncertainty measures indicating the confidence meets a second threshold, the knowledge distillation is performed with a higher weight towards the position data; and training a second model based on the updated feature data.

10. The method of claim 9, wherein the updated feature data is determined using focal distillation for points within the image data based on corresponding points within the position data.

11. The method of claim 9, wherein the occluded regions are determined based on the image data, the position data, or a combination thereof.

12. The method of claim 9, wherein the uncertainty measures are determined based on error variance in the image data.

13. The method of claim 12, wherein the uncertainty measures are determined by applying a likelihood-based loss function to the image data.

14. The method of claim 9, wherein the uncertainty measures are determined based on estimation variance in the first model.

15. The method of claim 9, wherein determining the updated feature data comprises determining, based on the uncertainty measures, the updated feature data (i) based on knowledge distillation, (ii) based on occluded regions within the image data, or (iii) a combination thereof.

16. An apparatus, comprising:

an image sensor configured to capture image data for an area surrounding a vehicle;

a position sensor configured to capture position data for the area surrounding the vehicle;

a memory storing processor-readable code; and at least one processor coupled to the memory, the image sensor, and the position sensor, the at least one processor configured to execute the processor-readable code to cause the at least one processor to perform operations including:

receiving image data and position data captured from the area surrounding the vehicle;

determining, by a first model based on the image data and the position data, initial feature data for the area surrounding the vehicle;

determining uncertainty measures corresponding to portions of the initial feature data, wherein the uncertainty measures are determined based on error variance in the image data;

determining updated feature data for at least a subset of the initial feature data based on the initial feature data and the uncertainty measures, wherein determining the updated feature data comprises determining updated perspective features for the initial feature data, wherein the updated feature data is determined using knowledge distillation, the knowledge distillation being weighted between the initial feature data and the position data based on the uncertainty measures, wherein the knowledge distillation is weighted based on the uncertainty measures such that:

when the uncertainty measures indicating a confidence meets a first threshold, the knowledge distillation is performed with a higher weight towards the initial feature data; and when the uncertainty measures indicating the confidence meets a second threshold, the knowledge distillation is performed with a higher weight towards the position data; and training a second model based on the updated feature data.

17. The apparatus of claim 16, wherein the operations further comprise determining occluded regions within the image data, wherein determining the updated feature data further comprises determining the updated feature data for objects corresponding to the occluded regions.

18. The apparatus of claim 17, wherein the updated feature data is determined using focal distillation for points within the image data based on corresponding points within the position data.

19. The apparatus of claim 17, wherein the occluded regions are determined based on the image data, the position data, or a combination thereof.

20. The apparatus of claim 16, wherein the uncertainty measures are determined based on error variance in the image data.

21. The apparatus of claim 20, wherein the uncertainty measures are determined by applying a likelihood-based loss function to the image data.

22. The apparatus of claim 16, wherein the uncertainty measures are determined based on estimation variance in the first model.

23. An apparatus, comprising:

an image sensor configured to capture image data for an area surrounding a vehicle;

a position sensor configured to capture position data for the area surrounding the vehicle;

a memory storing processor-readable code; and at least one processor coupled to the memory, the image sensor, and the position sensor, the at least one processor configured to execute the processor-readable code to cause the at least one processor to perform operations including:

receiving image data and position data captured from the area surrounding the vehicle;

determining, by a first model based on the image data and the position data, initial feature data for the area surrounding the vehicle;

determining occluded regions within the image data;

determining uncertainty measures corresponding to portions of the initial feature data, wherein the uncertainty measures are determined based on error variance in the image data;

determining updated feature data for objects corresponding to the occluded regions, wherein determining the updated feature data comprises determining updated top-view features for the initial feature data, wherein determining the updated feature data comprises determining the updated feature data for at least a subset of the initial feature data based on the initial feature data and the uncertainty measures using knowledge distillation, wherein the knowledge distillation is weighted between the initial feature data and the position data based on the uncertainty measures, wherein the knowledge distillation is weighted based on the uncertainty measures such that:

when the uncertainty measures indicating a confidence meets a first threshold, the knowledge distillation is performed with a higher weight towards the initial feature data; and when the uncertainty measures indicating the confidence meets a second threshold, the knowledge distillation is performed with a higher weight towards the position data; and training a second model based on the updated feature data.

24. The apparatus of claim 23, wherein the updated feature data is determined using focal distillation for points within the image data based on corresponding points within the position data.

25. The apparatus of claim 23, wherein the occluded regions are determined based on the image data, the position data, or a combination thereof.

26. The apparatus of claim 23, wherein the uncertainty measures are determined based on error variance in the image data.

27. The apparatus of claim 26, wherein the uncertainty measures are determined by applying a likelihood-based loss function to the image data.

28. The apparatus of claim 23, wherein the uncertainty measures are determined based on estimation variance in the first model.

* * * * *